(12) United States Patent
Rao et al.

(10) Patent No.: US 10,217,122 B2
(45) Date of Patent: Feb. 26, 2019

(54) METHOD, MEDIUM, AND APPARATUS TO GENERATE ELECTRONIC MOBILE MEASUREMENT CENSUS DATA

(71) Applicant: The Nielsen Company (US), LLC, New York, NY (US)

(72) Inventors: Kumar Nagaraja Rao, Fremont, CA (US); Tianjue Luo, Sunnyvale, CA (US); Albert Ronald Perez, San Francisco, CA (US); Stephen S. Bell, McHenry, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/953,177

(22) Filed: Apr. 13, 2018

(65) Prior Publication Data

US 2018/0232748 A1 Aug. 16, 2018

Related U.S. Application Data

(63) Continuation of application No. 14/569,474, filed on Dec. 12, 2014, now Pat. No. 9,953,330.
(Continued)

(51) Int. Cl.
G06Q 30/02 (2012.01)
(52) U.S. Cl.
CPC .................. *G06Q 30/0201* (2013.01)
(58) Field of Classification Search
None
See application file for complete search history.

(56) References Cited

U.S. PATENT DOCUMENTS 5,584,050 A 12/1996 Lyons
5,594,934 A 1/1997 Lu et al.
(Continued)

FOREIGN PATENT DOCUMENTS

AU 2013205736 5/2013
CN 101077014 11/2007
(Continued)

OTHER PUBLICATIONS

Patent Cooperation Treaty, "International Preliminary Report on Patentability," issued in connection with Application No. PCT/US2013/057045, dated Mar. 3, 2015 (1 page).
(Continued)

*Primary Examiner* — Kurtis Gills
*Assistant Examiner* — Akosua Kyereme-Tuah
(74) *Attorney, Agent, or Firm* — Hanley, Flight & Zimmerman, LLC

(57) ABSTRACT

Disclosed example methods include generating electronic mobile measurement data based on network communications received from client devices, the network communications corresponding to media accessed at the client devices, selecting attributes associated with the electronic mobile measurement data to include in a model, generating the model based on the attributes and a first portion of the electronic mobile measurement data, determining a percentage of a second portion of the electronic mobile measurement data that the model correctly associates with corresponding users of the client devices, and in response to the percentage satisfying a threshold, identifying a user operating a client device as at least one of a primary user or one of a plurality of secondary users based on the model, and associating demographic information of the identified user with the electronic mobile measurement data to reduce a misattribution error.

20 Claims, 8 Drawing Sheets

Related U.S. Application Data

(60) Provisional application No. 61/952,729, filed on Mar. 13, 2014.

(56) References Cited

U.S. PATENT DOCUMENTS

| | | | |
|---|---|---|---|
| 5,675,510 A * | 10/1997 | Coffey | G06F 11/3466 |
| | | | 707/999.104 |
| 5,796,952 A | 8/1998 | Davis et al. | |
| 5,832,520 A | 11/1998 | Miller | |
| 5,848,396 A | 12/1998 | Gerace | |
| 5,870,740 A | 2/1999 | Rose et al. | |
| 5,948,061 A | 9/1999 | Merriman et al. | |
| 6,035,339 A | 3/2000 | Agraharam et al. | |
| 6,052,730 A | 4/2000 | Felciano et al. | |
| 6,055,573 A | 4/2000 | Gardenswartz et al. | |
| 6,098,093 A | 8/2000 | Bayeh et al. | |
| 6,102,406 A | 8/2000 | Miles et al. | |
| 6,108,637 A | 8/2000 | Blumenau | |
| 6,138,155 A | 10/2000 | Davis et al. | |
| 6,141,694 A | 10/2000 | Gardner | |
| 6,223,215 B1 | 4/2001 | Hunt et al. | |
| 6,415,323 B1 | 7/2002 | McCanne et al. | |
| 6,434,614 B1 | 8/2002 | Blumenau | |
| 6,460,079 B1 | 10/2002 | Blumenau | |
| 6,529,952 B1 | 3/2003 | Blumenau | |
| 6,658,410 B1 | 12/2003 | Sakamaki et al. | |
| 6,704,787 B1 | 3/2004 | Umbreit | |
| 6,839,680 B1 | 1/2005 | Liu et al. | |
| 6,877,007 B1 | 4/2005 | Hentzel et al. | |
| 6,993,590 B1 | 1/2006 | Gauthier et al. | |
| 7,039,699 B1 | 5/2006 | Narin et al. | |
| 7,092,926 B2 | 8/2006 | Cerrato | |
| 7,159,023 B2 | 1/2007 | Tufts | |
| 7,181,412 B1 | 2/2007 | Fulgoni et al. | |
| 7,260,837 B2 | 8/2007 | Abraham et al. | |
| 7,343,417 B2 | 3/2008 | Baum | |
| 7,386,473 B2 | 6/2008 | Blumenau | |
| 7,406,516 B2 | 7/2008 | Davis et al. | |
| 7,546,370 B1 | 6/2009 | Acharya et al. | |
| 7,590,568 B2 | 9/2009 | Blumenau | |
| 7,613,635 B2 | 11/2009 | Blumenau | |
| 7,644,156 B2 | 1/2010 | Blumenau | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,756,974 B2 | 7/2010 | Blumenau | |
| 7,788,216 B2 | 8/2010 | Li et al. | |
| 7,882,242 B2 | 2/2011 | Chen | |
| 7,941,525 B1 | 5/2011 | Yavilevich | |
| 7,949,565 B1 | 5/2011 | Eldering et al. | |
| 7,958,234 B2 | 6/2011 | Thomas et al. | |
| 7,962,603 B1 | 6/2011 | Morimoto | |
| 8,046,255 B2 | 10/2011 | Bistriceanu et al. | |
| 8,060,601 B1 | 11/2011 | Brown et al. | |
| 8,131,763 B2 | 3/2012 | Tuscano et al. | |
| 8,131,861 B2 | 3/2012 | Butler et al. | |
| 8,229,780 B2 | 7/2012 | Davidow et al. | |
| 8,266,687 B2 | 9/2012 | Baldry | |
| 8,271,886 B2 | 9/2012 | Lee et al. | |
| 8,302,120 B2 | 10/2012 | Ramaswamy | |
| 8,307,006 B2 | 11/2012 | Hannan et al. | |
| 8,370,489 B2 | 2/2013 | Mazumdar et al. | |
| 8,504,507 B1 | 8/2013 | Srinivasaiah | |
| 8,549,552 B2 | 10/2013 | Ramaswamy et al. | |
| 8,631,122 B2 | 1/2014 | Kadam et al. | |
| 8,700,457 B2 | 4/2014 | Craft | |
| 8,713,168 B2 | 4/2014 | Heffernan et al. | |
| 8,751,461 B2 | 6/2014 | Abraham et al. | |
| 8,843,626 B2 | 9/2014 | Mazumdar et al. | |
| 8,909,771 B2 | 12/2014 | Heath | |
| 8,910,195 B1 | 12/2014 | Barney et al. | |
| 8,954,536 B2 | 2/2015 | Kalus et al. | |
| 9,953,330 B2 | 4/2018 | Rao et al. | |
| 2002/0099609 A1 | 7/2002 | Nascenzi et al. | |
| 2002/0198762 A1 * | 12/2002 | Donato | H04H 60/45 |
| | | | 725/24 |
| 2003/0006911 A1 | 1/2003 | Smith et al. | |
| 2003/0037131 A1 | 2/2003 | Verma | |
| 2003/0046385 A1 | 3/2003 | Vincent | |
| 2003/0177488 A1 | 9/2003 | Smith et al. | |
| 2003/0220901 A1 | 11/2003 | Carr et al. | |
| 2004/0088212 A1 | 5/2004 | Hill | |
| 2005/0027478 A1 * | 2/2005 | Tang | G06N 7/00 |
| | | | 702/181 |
| 2005/0166233 A1 | 7/2005 | Beyda et al. | |
| 2005/0223093 A1 | 10/2005 | Hanson et al. | |
| 2006/0178996 A1 | 8/2006 | Matsushima et al. | |
| 2006/0271641 A1 | 11/2006 | Stavrakos et al. | |
| 2006/0294259 A1 | 12/2006 | Matefi et al. | |
| 2007/0043769 A1 | 2/2007 | Kasahara et al. | |
| 2007/0106787 A1 | 5/2007 | Blumenau | |
| 2007/0106792 A1 | 5/2007 | Blumenau | |
| 2007/0156532 A1 | 7/2007 | Nyhan et al. | |
| 2007/0198327 A1 | 8/2007 | Yazdani et al. | |
| 2007/0260603 A1 | 11/2007 | Tuscano et al. | |
| 2008/0004958 A1 | 1/2008 | Ralph et al. | |
| 2008/0086356 A1 | 4/2008 | Glassman et al. | |
| 2008/0126420 A1 | 5/2008 | Wright et al. | |
| 2008/0195430 A1 * | 8/2008 | Rustagi | G06Q 10/06395 |
| | | | 705/7.41 |
| 2008/0201427 A1 | 8/2008 | Chen | |
| 2008/0201472 A1 | 8/2008 | Bistriceanu et al. | |
| 2008/0235243 A1 | 9/2008 | Lee et al. | |
| 2008/0248815 A1 | 10/2008 | Busch | |
| 2008/0276179 A1 | 11/2008 | Borenstein et al. | |
| 2009/0030780 A1 | 1/2009 | York et al. | |
| 2009/0055241 A1 | 2/2009 | Chen et al. | |
| 2009/0070443 A1 | 3/2009 | Vanderhook et al. | |
| 2009/0076899 A1 | 3/2009 | Gbodimowo | |
| 2009/0171762 A1 | 7/2009 | Alkove et al. | |
| 2009/0217315 A1 | 8/2009 | Malik et al. | |
| 2009/0307084 A1 | 12/2009 | Monighetti et al. | |
| 2009/0327026 A1 | 12/2009 | Bistriceanu et al. | |
| 2010/0010866 A1 | 1/2010 | Bal et al. | |
| 2010/0070621 A1 | 3/2010 | Urdan et al. | |
| 2010/0088152 A1 | 4/2010 | Bennett | |
| 2010/0121676 A1 | 5/2010 | Jackson | |
| 2010/0153544 A1 | 6/2010 | Krassner et al. | |
| 2010/0191723 A1 | 7/2010 | Perez et al. | |
| 2010/0205057 A1 | 8/2010 | Hook et al. | |
| 2010/0241745 A1 | 9/2010 | Offen et al. | |
| 2010/0262498 A1 | 10/2010 | Nolet et al. | |
| 2010/0268540 A1 | 10/2010 | Arshi et al. | |
| 2010/0268573 A1 | 10/2010 | Jain et al. | |
| 2010/0299604 A1 | 11/2010 | Blumenau | |
| 2010/0325051 A1 | 12/2010 | Etchegoyen | |
| 2010/0333125 A1 * | 12/2010 | Eldering | H04N 21/2353 |
| | | | 725/14 |
| 2011/0016482 A1 | 1/2011 | Tidwell et al. | |
| 2011/0041062 A1 | 2/2011 | Singer et al. | |
| 2011/0087519 A1 | 4/2011 | Fordyce, III et al. | |
| 2011/0093327 A1 | 4/2011 | Fordyce, III et al. | |
| 2011/0106620 A1 | 5/2011 | Setiawan et al. | |
| 2011/0137733 A1 | 6/2011 | Baird et al. | |
| 2011/0153391 A1 | 6/2011 | Tenbrock | |
| 2011/0191184 A1 | 8/2011 | Blackhurst et al. | |
| 2011/0191664 A1 | 8/2011 | Sheleheda et al. | |
| 2011/0191831 A1 | 8/2011 | Chan et al. | |
| 2011/0202500 A1 | 8/2011 | Warn et al. | |
| 2011/0208860 A1 | 8/2011 | Sim et al. | |
| 2011/0231240 A1 | 9/2011 | Schoen et al. | |
| 2011/0246297 A1 | 10/2011 | Buchalter et al. | |
| 2011/0246306 A1 | 10/2011 | Blackhurst et al. | |
| 2011/0246641 A1 | 10/2011 | Pugh et al. | |
| 2011/0288907 A1 | 11/2011 | Harvey et al. | |
| 2012/0005213 A1 | 1/2012 | Hannan et al. | |
| 2012/0030037 A1 | 2/2012 | Carriero | |
| 2012/0042005 A1 | 2/2012 | Papakostas et al. | |
| 2012/0072469 A1 | 3/2012 | Perez et al. | |
| 2012/0109709 A1 | 5/2012 | Fordyce, III et al. | |
| 2012/0109882 A1 | 5/2012 | Bouse et al. | |

(56) References Cited

U.S. PATENT DOCUMENTS

| | | | |
|---|---|---|---|
| 2012/0110027 A1 | 5/2012 | Falcon | |
| 2012/0110071 A1 | 5/2012 | Zhou et al. | |
| 2012/0143713 A1 | 6/2012 | Dittus et al. | |
| 2012/0151079 A1 | 6/2012 | Besehanic et al. | |
| 2012/0151322 A1 | 6/2012 | Lindsay et al. | |
| 2012/0158954 A1 | 6/2012 | Heffernan et al. | |
| 2012/0166520 A1 | 6/2012 | Lindsay et al. | |
| 2012/0173701 A1 | 7/2012 | Tenbrock | |
| 2012/0185274 A1 | 7/2012 | Hu | |
| 2012/0192214 A1 | 7/2012 | Hunn et al. | |
| 2012/0209920 A1 | 8/2012 | Neystadt et al. | |
| 2012/0215621 A1 | 8/2012 | Heffernan et al. | |
| 2012/0239407 A1 | 9/2012 | Lynch et al. | |
| 2012/0239809 A1 | 9/2012 | Mazumdar et al. | |
| 2012/0260278 A1* | 10/2012 | Lambert | H04H 60/45 725/14 |
| 2012/0302222 A1 | 11/2012 | Williamson et al. | |
| 2012/0310729 A1 | 12/2012 | Dalto et al. | |
| 2012/0311017 A1 | 12/2012 | Sze et al. | |
| 2013/0013308 A1 | 1/2013 | Cao et al. | |
| 2013/0060629 A1 | 3/2013 | Rangsikitpho et al. | |
| 2013/0080263 A1 | 3/2013 | Goldman et al. | |
| 2013/0097311 A1 | 4/2013 | Mazumdar et al. | |
| 2013/0097312 A1 | 4/2013 | Mazumdar et al. | |
| 2013/0124628 A1 | 5/2013 | Weerasinghe | |
| 2013/0138506 A1 | 5/2013 | Zhu et al. | |
| 2013/0145022 A1 | 6/2013 | Srivastava et al. | |
| 2013/0159499 A1 | 6/2013 | Besehanic | |
| 2013/0198125 A1 | 8/2013 | Oliver et al. | |
| 2013/0212188 A1 | 8/2013 | Duterque et al. | |
| 2013/0246389 A1 | 9/2013 | Osann, Jr. | |
| 2013/0246609 A1 | 9/2013 | Topchy et al. | |
| 2013/0282898 A1 | 10/2013 | Kalus et al. | |
| 2013/0297411 A1 | 11/2013 | Van Datta et al. | |
| 2013/0332604 A1 | 12/2013 | Seth et al. | |
| 2014/0033317 A1 | 1/2014 | Barber | |
| 2014/0156761 A1 | 6/2014 | Heffernan et al. | |
| 2014/0324544 A1 | 10/2014 | Donato et al. | |
| 2014/0324545 A1 | 10/2014 | Splaine et al. | |
| 2014/0337104 A1 | 11/2014 | Splaine et al. | |
| 2015/0019322 A1 | 1/2015 | Alla et al. | |
| 2015/0019327 A1 | 1/2015 | Mazumdar et al. | |
| 2015/0046579 A1 | 2/2015 | Perez et al. | |

FOREIGN PATENT DOCUMENTS

| | | |
|---|---|---|
| CN | 101222348 | 7/2008 |
| CN | 101505247 | 8/2009 |
| GB | 2176639 | 12/1986 |
| JP | H07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2010039845 | 2/2010 |
| JP | 2010257448 | 11/2010 |
| KR | 20020037980 | 5/2002 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 2000041115 | 7/2000 |
| WO | 200207054 | 1/2002 |
| WO | 2003027860 | 4/2003 |
| WO | 2005024689 | 3/2005 |
| WO | 2010088372 | 8/2010 |
| WO | 2010104285 | 9/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2012177870 | 12/2012 |
| WO | 2013122907 | 8/2013 |
| WO | 2013188429 | 12/2013 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |

OTHER PUBLICATIONS

Patent Cooperation Treaty, "International Search Report," issued in connection with Application No. PCT/US2014/068623, dated Mar. 23, 2015 (3 pages).

Patent Cooperation Treaty, "Written Opinion," issued in connection with Application No. PCT/US2014/068623, dated Mar. 23, 2015 (8 pages).

Patent Cooperation Treaty, "International Search Report," issued in connection with Application No. PCT/US2014/068202, dated Apr. 10, 2015, (3 pages).

Patent Cooperation Treaty, "Written Opinion," issued in connection with Application No. PCT/US2014/068202, dated Apr. 10, 2015, (7 pages).

Patent Cooperation Treaty, "International Search Report," issued in connection with Application No. PCT/US2014/068621, dated Feb. 27, 2015, (3 pages).

Patent Cooperation Treaty, "Written Opinion," issued in connection with Application No. PCT/US2014/068621, dated Feb. 27, 2015, (7 pages).

Canadian Intellectual Property Office, "Examination Search Report," issued in connection with Application No. 2,810,541 dated Jan. 20, 2015, (3 pages).

The State Intellectual Property Office of China, "First Notification of Office Action," issued in connection with Application No. 201180045957.2, dated Nov. 15, 2014, (20 pages).

Japanese Patent Office, "Final Rejection," issued in connection with Japanese Patent Application No. P2014-005867 dated Aug. 26, 2014, (8 pages).

Japanese Patent Office, "Notice of Reasons for Rejection," issued in connection with Japanese Patent Application No. P2014-005867 dated Feb. 17, 2015, (6 pages).

Japanenese Patent Office, "Notice of Reasons for Rejection," issued in connection with Japanese Patenet Application No. P2014-005867 dated Apr. 15, 2014, (10 pages).

United States Patent and Trademark Office, "Office Action," issued in connection with U.S. Appl. No. 14/500,297, dated Jan. 5, 2015, (7 pages).

IP Australia, "Patent Examination Report No. 1," issued in connection with Australian Patent Application No. 2013203898, dated Nov. 27, 2014 (4 pages).

International Bureau, "International Preliminary Report on Patentability," issued in connection with International Application No. PCT/US2015/020179, dated Sep. 17, 2016, 7 pages.

United States Patent and Trademark Office, "Notice of Allowance," issued in connection with U.S. Appl. No. 14/569,474, dated Dec. 14, 2017, 9 pages.

United States Patent and Trademark Office, "Final Office Action," issued in connection with U.S. Appl. No. 14/569,474, dated Jul. 27, 2017, 52 pages.

United States Patent and Trademark Office, "Non-final Office Action," issued in connection with U.S. Appl. No. 14/569,474, dated Jan. 26, 2017, 48 pages.

* cited by examiner

METHOD, MEDIUM, AND APPARATUS TO GENERATE ELECTRONIC MOBILE MEASUREMENT CENSUS DATA

RELATED APPLICATIONS

This patent arises from a continuation of U.S. patent application Ser. No. 14/569,474 entitled "Methods, Apparatus and Computer Readable Media to Generate Electronic Mobile Measurement Census Data," filed Dec. 12, 2014, which claims the benefit of U.S. Provisional Patent Application Ser. No. 61/952,729, filed Mar. 13, 2014, entitled "Methods and Apparatus to Model Activity Assignment." U.S. patent application Ser. No. 14/569,474 and U.S. Provisional Patent Application No. 61/952,729 are hereby incorporated herein by reference in their entireties.

FIELD OF THE DISCLOSURE

This disclosure relates generally to audience measurement and, more particularly, to generating electronic mobile measurement census data.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media (e.g., television programs or radio programs, movies, DVDs, advertisements, etc.) exposed to those panel members. In this manner, the audience measurement entity can determine exposure measures for different media based on the collected media measurement data.

Techniques for monitoring user access to Internet resources such as web pages, advertisements and/or other media have evolved significantly over the years. Some prior systems perform such monitoring primarily through server logs. In particular, entities serving media on the Internet can use such prior systems to log the number of requests received for their media at their server.

DETAILED DESCRIPTION

Figure 1:
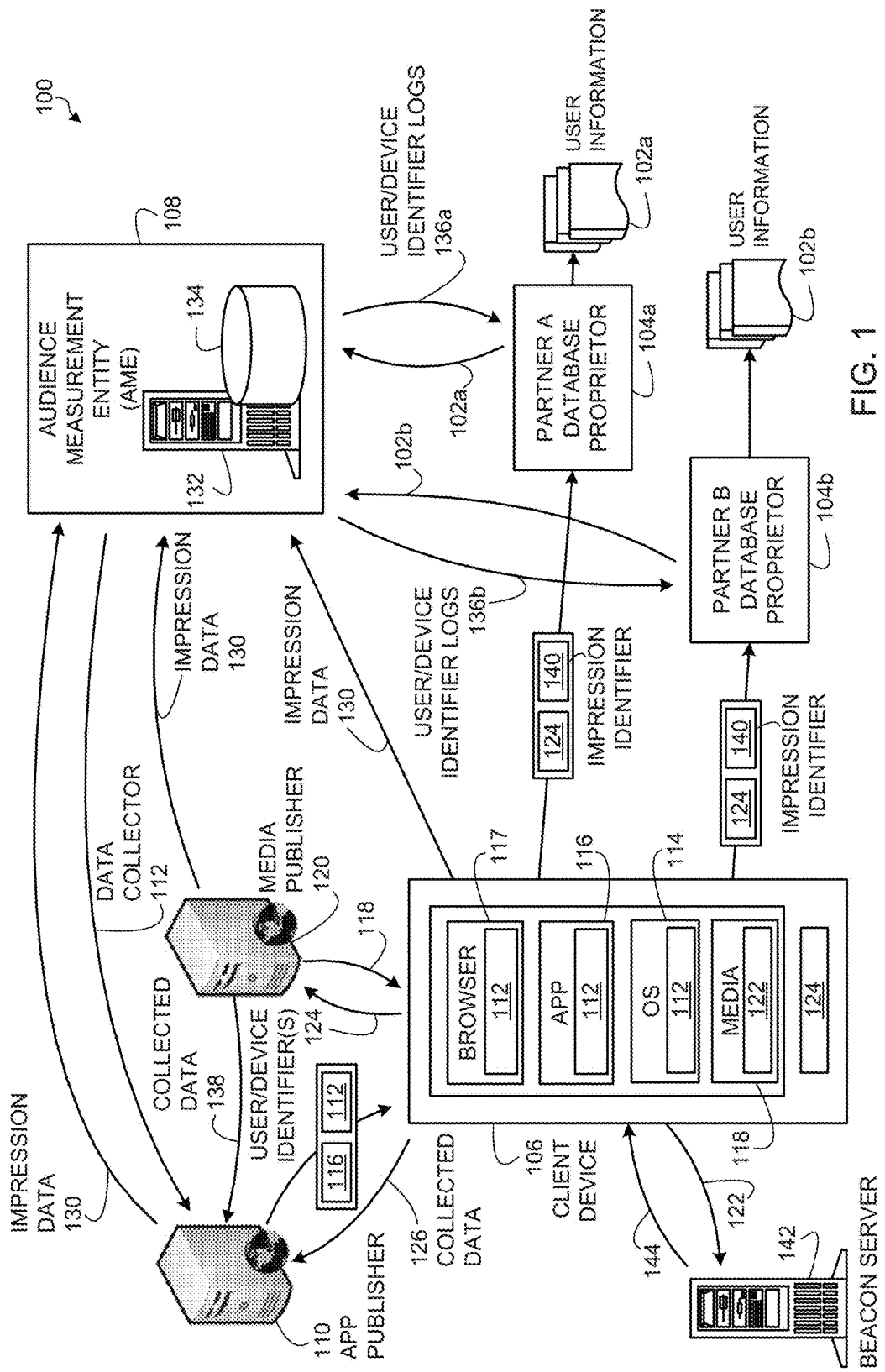
FIG. 1 depicts an example system to collect impressions of media presented on mobile devices and to collect user information from distributed database proprietors for associating with the collected impressions.

Examples disclosed herein may be used to generate and use models to correct for misattribution errors in collected impressions reported by electronic devices. As used herein, an impression is an instance of a person's exposure to media (e.g., content, advertising, etc.). When an impression is logged to track an audience for particular media, the impression may be associated with demographics of the person corresponding to the impression. This is referred to as attributing demographic data to an impression, or attributing an impression to demographic data. In this manner, media exposures of audiences and/or media exposures across different demographic groups can be measured. However, misattribution errors in collected impressions can occur when incorrect demographic data is attributed to an impression by incorrectly assuming which person corresponds to a logged impression. Such misattribution errors can significantly decrease the accuracies of media measurements. To improve accuracies of impression data having misattribution errors, examples disclosed herein may be used to re-assign logged impressions to different people (and, thus demographic data) identified as having a higher probability or likelihood of being the person corresponding to the logged impression. Examples disclosed herein perform such re-assigning of logged impressions to different demographic data by generating and using activity assignment models.

An audience measurement entity (AME) measures the size of audiences exposed to media to produce ratings. Ratings are used by advertisers and/or marketers to purchase advertising space and/or design advertising campaigns. Additionally, media producers and/or distributors use the ratings to determine how to set prices for advertising space and/or to make programming decisions. As a larger portion of audiences use portable devices (e.g., tablets, smartphones, etc.) to access media, advertisers and/or marketers are interested in accurately calculated ratings (e.g. mobile television ratings (MTVR), etc.) for media accessed on these devices.

To measure audiences on mobile devices, an AME may use instructions (e.g., Java, java script, or any other computer language or script) embedded in media as describe below in connection with FIG. 1 to collect information indicating when audience members are accessing media on a mobile device. Media to be traced are tagged with these instructions. When a device requests the media, both the media and the instructions are downloaded to the client. The instructions cause information about the media access to be sent from a mobile device to a monitoring entity (e.g., the AME). Examples of tagging media and tracing media through these instructions are disclosed in U.S. Pat. No. 6,108,637, issued Aug. 22, 2000, entitled "Content Display Monitor," which is incorporated by reference in its entirety herein.

Additionally, the instructions cause one or more user and/or device identifiers (e.g., an international mobile equipment identity (IMEI), a mobile equipment identifier (MEID), a media access control (MAC) address, an app store identifier, an open source unique device identifier (OpenUDID), an open device identification number (ODIN), a login identifier, a username, an email address, user agent data, third-party service identifiers, web storage data, document object model (DOM) storage data, local shared objects, an automobile vehicle identification number (VIN), etc.) located on a mobile device to be sent to a partnered database proprietor (e.g., Facebook, Twitter, Google, Yahoo!, MSN, Apple, Experian, etc.) to identify demographic information (e.g., age, gender, geographic location, race, income level, education level, religion, etc.) for the audience member of the mobile device collected via a user registration process. For example, an audience member may be viewing an episode of "The Walking Dead" in a media streaming app. In that instance, in response to instructions executing within the app, a user/device identifier stored on the mobile device is sent to the AME and/or a partner database proprietor to associate the instance of media exposure (e.g., an impression) to corresponding demographic data of the audience member. The database proprietor can then send logged demographic impression data to the AME for use by the AME in generating, for example, media ratings and/or other audience measures. In some examples, the partner database proprietor does not provide individualized demographic data (e.g., user-level demographics) in association with logged impressions. Instead, in some examples, the partnered database proprietor provides aggregate demographic impression data (sometimes referred to herein as "aggregate census data"). For example, the aggregate demographic impression data provided by the partner database proprietor may state that a thousand males age 17-34 watched the episode of "The Walking Dead" in the last seven days via mobile devices. However, the aggregate demographic data from the partner database proprietor does not identify individual persons (e.g., is not user-level data) associated with individual impressions. In this manner, the database proprietor protects the privacies of its subscribers/users by not revealing their identities and, thus, user-level media access activities, to the AME.

The AME uses this aggregate census data to calculate ratings and/or other audience measures for corresponding media. However, because mobile devices can be shared, misattribution can occur within the aggregate census data. Misattribution occurs when an impression corresponding to an individual in a first demographic group is attributed to an individual in a second demographic group. For example, initially, a first person in a household uses the mobile device to access a web site associated with a database proprietor (e.g., via a web browser of the mobile device, via an app installed on the mobile device, etc.), and the database proprietor may recognize the first person as being associated with the mobile device based on the access (e.g., a login event and/or other user-identifying event) by the first person. Subsequently, the first person stops using the device but does not log out of the database proprietor system on the device (or does not otherwise notify the database proprietor system and/or device that he/she is no longer using the device) and/or the second person does not log in to the database proprietor system (or perform any other user-identifying activity) to allow the database proprietor to recognize the second person as a different user than the first person. Consequently, when the second person begins using the same mobile device to access media, the database proprietor continues to (in this case, incorrectly) recognize media accesses of the mobile device (e.g., media impressions) as being associated with the first person. Therefore, impressions that should be attributed to the second person and the second demographic group are incorrectly attributed (e.g., misattributed) to the first person and the first demographic group. For example, a 17-year old male household member may use a mobile device of a 42-year old female to watch "The Walking Dead." In such an example, if the 42-year old female is not logged out of a user-identifying service, too, or app (e.g., a social networking service, tool, or app or any other user identifying service, tool, or app on the mobile device), the impression that occurs when the 17-year old accesses "The Walking Dead" media will be misattributed to the 42-year old female. The effect of large-scale misattribution error may create measurement bias error by incorrectly representing the demographic distribution of media impressions across a large audience and, therefore, misrepresenting the audience demographics of impressions collected for advertisements and/or other media to which exposure is monitored by the AME.

Misattribution error also occurs when a mobile device is generally associated with use by a particular household member, but occasionally used by another person. In such examples, one or more user/device identifiers (e.g., an international mobile equipment identity (IMEI), a mobile equipment identifier (MEID), a media access control (MAC) address, an app store identifier, an open source unique device identifier (OpenUDID), an open device identification number (ODIN), a login identifier, a username, an email address, user agent data, third-party service identifiers, web storage data, document object model (DOM) storage data, local shared objects, an automobile vehicle identification number (VIN), etc.) on the device is/are associated at a database proprietor with the particular household member as described below in connection with FIG. 1. As such, when the particular household member uses the mobile device to access media, and the media accesses are reported to a database proprietor along with one or more user/device identifier(s), the database proprietor logs impressions of the media accesses in association with the demographic information identified based on the user/device identifier(s). However, on the occasion when the mobile device is shared and used by a second household member, media accesses during such time that are reported to the database proprietor along with the user/device identifier(s) of the mobile device are incorrectly attributed (e.g., misattributed) to the particular household member that is associated with the mobile device rather than being attributed to the second household member.

To correct impression data for misattribution errors, the AME uses responses to a survey conducted on randomly selected people and/or households to calculate correction factors. Such a survey is sometimes referred to herein as a probability survey. Survey responses include information about demographics of each member of the household, types of devices in the household, which members of the household use which devices, media viewing preferences, which members of the household are registered with which database proprietors, etc. The AME calculates the correction factors based on responses to the probability survey. The correction factors represent how often the impressions of one demographic group are misattributed to another group. For example, a misattribution factor may state that, in a household with a male, age 17-24 and a female, age 35-46, 1.56% of the exposure data attributed to the female, age 35-46 should be attributed to the male, age 17-24. In some examples, the correction factors are calculated for different characteristics of users, devices and/or media (e.g., age, gender, device type, media genre, etc.). For example, the misattribution error between a first demographic group and a second demographic group may be different on a tablet as compared to a smartphone. In such instances, the correction factors calculated for media accessed on a tablet would be different than the correction factors calculated for media accessed on a smartphone.

In some examples, the probability survey responses do not provide detailed information about which member of a household was exposed to which media category (e.g., comedy, drama, reality, etc.). For example, if during a survey of a household, a male, age 54-62, a female, age 62-80 and a female, age 18-34 indicated they watch drama programming on a tablet device, the AME assumes that each of those members of the household produce one-third of the impression data associated with accessing drama programming on a monitored tablet device of the household. However, the media exposure habits of the members of the household may be different. For example, the male, age 54-62 may only access 10% of the drama programming on the tablet, while the female, age 62-80 accesses 50% of the drama programming and the female, age 18-34 accesses 40% of the drama programming.

As disclosed below, to increase accuracies of misattribution correction factors that are for use in correcting for misattribution errors in aggregate demographic impression data generated by database proprietors, the AME may use census data generated from demographic impressions of panelists recruited to participate in an AME panel (sometimes referred to herein as "electronic mobile measure (EMM) panelists") on mobile devices. Demographic impression data collected through EMM panelists is highly accurate because the AME collects highly accurate demographic information from the EMM panelists and the EMM panelists consent to detailed monitoring of their accesses to media on mobile devices.

As used herein, a demographic impression is defined to be an impression that is associated with a characteristic (e.g., a demographic characteristic) of a person exposed to media. EMM panelist census data (sometimes referred to as "EMM census data" or "EMMC data") is defined herein to be demographic impression data that includes impression data (e.g., data representative of an impression, such as program identifier (ID), channel and/or application ID, time, date, etc.) of the EMM panelists combined with the corresponding demographic information of the EMM panelists. In some examples, EMM panelists may be identified by using user/device identifiers on the mobile device that are collected by instructions or data collectors in apps used to access media. Alternatively or additionally, EMM panelists may be identified using AME and/or partnered database proprietor cookies set on the mobile device via, for example, a web browser. For example, in response to instructions executing in a television viewing app, a media access app, or an Internet web browser, the mobile device may send impression data and a user/device identifier (e.g., EMM panelist ID, database proprietor ID, etc.) and/or cookie to the AME, a database proprietor, and/or any other entity that collects such information.

However, in households with multiple people, more than one person may share an EMM panelist's mobile device to access media without providing an indication of which member of the household is using the device. As such, impressions reported by the shared mobile device are misattributed to the wrong household member (e.g., misattributed to the EMM panelist regarded as being associated with the mobile device). For example, a 10-year old female household member may be using a 28-year old male EMM panelist's mobile device. In such an example, the impression data generated while the 10-year old female was using the mobile device would be misattributed to the 28-year old male EMM panelist. Such misattributions reduce the accuracy of the EMM census data.

As disclosed below the AME generates an activity assignment model (AAM) using historical exposure data to correct for misattribution errors in EMM census data. In disclosed examples, the AAM determines the probability (sometimes referred to herein as "a probability score") that a person with certain characteristics (e.g., age, gender, ethnicity, household size, etc.) would access a television program with certain characteristics (e.g., genre, etc.) at a certain time (e.g., day of the week, daypart, etc.). In disclosed examples, the AME also collects demographic information of other members of the panelist's household and information regarding their usage of mobile devices in the household (sometimes referred to herein as "supplemental survey data"). For example, the usage information may include types of mobile devices used in the household, the primary users of the mobile devices, and/or whether the EMM panelist's mobile device(s) is/are shared with other members of the household.

As disclosed below, using the AAM and the supplemental survey data, the AME corrects for misattribution errors in the EMM census data. In some examples disclosed herein, the AME assumes that the EMM panelist accessed the program on a mobile device that generated an impression request (e.g., a request to log an impression at the AME). When such an assumption is made, the AME determines if the presumption should and/or can be overcome. In some examples, the presumption is overcome if a probability score calculated (e.g., using the AAM) for the EMM panelist does not satisfy (e.g., is less than) a calibrated threshold. If the presumption is overcome, the AME assigns the logged impression to a different member of the EMM panelist's household. By processing numerous logged impressions from across numerous households in this manner, the AME generates AAM-adjusted EMM census data using examples disclosed herein.

As disclosed below, misattribution correction factors generated by the AME are calibrated using the AAM-adjusted EMM census data. The AAM-adjusted EMM census data is used to determine household sharing patterns indicative of members of a household who accessed a media category (e.g., media categorized by genre, etc.) on the mobile device and what percentage of audience activity is attributable to which household member. For example, in a household that shares a tablet to access (e.g., view, listen to, etc.) media, the AAM-adjusted EMM census data may indicate that a male, age 18-34 accesses 45% of the comedy media presented on the tablet, a female, age 18-43 accesses 20% of the comedy media presented on the tablet, a male, age 2-12 accesses 25% of the comedy media presented on the tablet, and a female, age 13-17 accesses 0% of the comedy media presented on the tablet. The AME uses the household sharing patterns combined with information included in the supplemental survey data (e.g., the database proprietor accounts each household member, devices used to access the database proprietor accounts by each household member, etc.) to calibrate the misattribution correction factors produced using the probability survey. In some examples, the AAM-adjusted EMM census data may be used to generate the misattribution correction factors in place of the probability survey.

In some examples, the AME contracts and/or enlists panelists using any desired methodology (e.g., random selection, statistical selection, phone solicitations, Internet advertisements, surveys, advertisements in shopping malls, product packaging, etc.). Demographic information (e.g., gender, occupation, salary, race and/or ethnicity, marital status, highest completed education, current employment status, etc.) is obtained from a panelist when the panelist joins (e.g., registers for) one or more panels (e.g., the EMM panel). For example, EMM panelists agree to allow the AME to monitor their media accesses on mobile devices (e.g., television programming accessed through a browser or an app, etc.). In some examples, to facilitate monitoring media accesses, the AME provides a metering app (e.g., an app used to associate the mobile device with the panelist) to the panelist after the panelist enrolls in the EMM panel.

Disclosed example methods generating electronic media measurement census data involve logging an impression based on a communication received from a client device, the logged impression corresponding to media accessed at the client device. The example methods further involve, when a panelist associated with the client device is determined to be an audience member of the media on the client device, associating demographic information of the panelist with the logged impression associated with the media. The example methods further involve when the panelist associated with the client device is determined not to be the audience member of the media at the client device, determining probability scores for respective household members residing in a household with the panelist, the probability scores indicative of probabilities that corresponding ones of the household members are the audience member of the media at the client device, and associating demographic information of one of the household members that has a highest probability score with the logged impression associated with the media.

In some example methods, determining whether the panelist associated with the client device is the audience member of the media presented on the client device further comprises determining that the panelist associated with the client device is the audience member of the media at the mobile device if a size of the household equals one.

In some example methods, determining whether the panelist associated with the client device is the audience member of the media presented on the client device further comprises determining that the panelist associated with the client device is the audience member of the media at the client device if the panelist has indicated that the panelist does not share the client device.

In some example methods, determining whether the panelist associated with the client device is the audience member of the media presented on the client device further comprises determining that the panelist associated with the client device is the audience member of the media at the client device if a probability score calculated for the panelist satisfies a threshold. In some example methods, the threshold is a calibration factor divided by the size of the household. In some such example methods, the calibration factor is based on demographic information of the panelist and a type of the client device. In some such example methods, the demographic information of the panelist and the type of the client device correspond to a first demographic group, and the calibration factor is a ratio of an average time that the first demographic group accessed the media and an average time that all demographic groups accessed the media.

In some example methods, the required processing resources on the client device are reduce by not requiring the user of the client device to self-identify.

Disclosed example apparatus include an impression server to log an impression based on a communication received from a client device, the logged impression corresponding to media accessed at the client device. The example apparatus further includes a probability calculator to, when a panelist associated with the client device is determined not to be the person who accessed the media at the client device, determine probability scores for respective household members residing in a household with the panelist, the probability scores indicative of probabilities that corresponding ones of the household members are the person who accessed the media at the client device. The example apparatus further includes a processor to, when a panelist associated with the client device is determined to be the person who accessed the media at the client device, associate demographic information of the panelist with the logged impression associated with the media, and when the panelist associated with the client device is determined to not be the person who accessed the media at the client device, associate demographic information of one of the household members that has a highest probability score with the logged impression associated with the media.

In some example apparatus, to determine whether the panelist associated with the client device is the person who accessed the media at the client device, the probability calculator is further to determine that the panelist associated with the client device is the person who accessed the media at the client device if a size of the household equals one.

In some example apparatus, to determine whether the panelist associated with the client device is the person who accessed the media at the client device, the probability calculator is further to determine that the panelist associated with the client device is the person who accessed the media at the client device if the panelist has indicated that the panelist does not share the client device.

In some example apparatus, to determine whether the panelist associated with the client device is the person who accessed the media at the client device, the probability calculator is further to determine if a probability score calculated for the panelist satisfies a threshold. In some such apparatus, the threshold is a calibration factor divided by the size of the household. In some such apparatus, the calibration factor is based on demographic information of the panelist and a type of the client device. In some such apparatus, the demographic information of the panelist and the type of the client device define a first demographic group, and the calibration factor is a ratio of an average time that the first demographic group accessed the media and an average time that all demographic groups accessed the media.

FIG. 1 depicts an example system 100 to collect user information (e.g., user information 102a, 102b) from distributed database proprietors 104a, 104b for associating with impressions of media presented at a client device 106. In the illustrated examples, user information 102a, 102b or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Examples disclosed herein are described in connection with a mobile device, which may be a mobile phone, a mobile communication device, a tablet, a gaming device, a portable media presentation device, an in-vehicle or vehicle-integrated communication system, such as an automobile infotainment system with wireless communication capabilities, etc. However, examples disclosed herein may be implemented in connection with non-mobile devices such as internet appliances, smart televisions, internet terminals, computers, or any other device capable of presenting media received via network communications.

In the illustrated example of FIG. 1, to track media impressions on the client device 106, an audience measurement entity (AME) 108 partners with or cooperates with an app publisher 110 to download and install a data collector 112 on the client device 106. The app publisher 110 of the illustrated example may be a software app developer that develops and distributes apps to mobile devices and/or a distributor that receives apps from software app developers and distributes the apps to mobile devices. The data collector 112 may be included in other software loaded onto the client device 106, such as the operating system 114, an application (or app) 116, a web browser 117, and/or any other software. In some examples, the example client device 106 of FIG. 1 is a non-locally metered device. For example, the client device 106 of a non-panelist household does not support and/or has not been provided with specific metering software (e.g., dedicated metering software provided directly by the AME 108 and executing as a foreground or background process for the sole purpose of monitoring media accesses/exposure).

Any of the example software 114-117 may present media 118 received from a media publisher 120. The media 118 may be an advertisement, video, audio, text, a graphic, a web page, news, educational media, entertainment media, or any other type of media. In the illustrated example, a media ID 122 is provided in the media 118 to enable identifying the media 118 so that the AME 108 can credit the media 118 with media impressions when the media 118 is presented on the client device 106 or any other device that is monitored by the AME 108.

The data collector 112 of the illustrated example includes instructions (e.g., Java, java script, or any other computer language or script) that, when executed by the client device 106, cause the client device 106 to collect the media ID 122 of the media 118 presented by the app program 116 and/or the client device 106, and to collect one or more device/user identifier(s) 124 stored in the client device 106. The device/user identifier(s) 124 of the illustrated example include identifiers that can be used by corresponding ones of the partner database proprietors 104a-b to identify the user or users of the client device 106, and to locate user information 102a-b corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), web storage data, document object model (DOM) storage data, local shared objects (also referred to as "Flash cookies"), an automobile vehicle identification number (VIN), etc. In some examples, fewer or more device/user identifier(s) 124 may be used. In addition, although only two partner database proprietors 104a-b are shown in FIG. 1, the AME 108 may partner with any number of partner database proprietors to collect distributed user information (e.g., the user information 102a-b).

In some examples, the client device 106 may not allow access to identification information stored in the client device 106. For such instances, the disclosed examples enable the AME 108 to store an AME-provided identifier (e.g., an identifier managed and tracked by the AME 108) in the client device 106 to track media impressions on the client device 106. For example, the AME 108 may provide instructions in the data collector 112 to set an AME-provided identifier in memory space accessible by and/or allocated to the app program 116. The data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the client device 106 for extended durations and from app to app. In some examples in which the data collector 112 sets an identifier in the client device 106, the AME 108 may recruit a user of the client device 106 as a panelist, and may store user information collected from the user during a panelist registration process and/or collected by monitoring user activities/behavior via the client device 106 and/or any other device used by the user and monitored by the AME 108. In this manner, the AME 108 can associate user information of the user (from panelist data stored by the AME 108) with media impressions attributed to the user on the client device 106.

In the illustrated example, the data collector 112 sends the media ID 122 and the one or more device/user identifier(s) 124 as collected data 126 to the app publisher 110. Alternatively, the data collector 112 may be configured to send the collected data 126 to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the client device 106). In the illustrated example, the app publisher 110 (or a collection entity) sends the media ID 122 and the device/user identifier(s) 124 as impression data 130 to a server 132 at the AME 108. The impression data 130 of the illustrated example may include one media ID 122 and one or more device/user identifier(s) 124 to report a single impression of the media 118, or it may include numerous media ID's 122 and device/user identifier(s) 124 based on numerous instances of collected data (e.g., the collected data 126) received from the client device 106 and/or other mobile devices to report multiple impressions of media.

In the illustrated example, the server 132 stores the impression data 130 in an AME media impressions store 134 (e.g., a database or other data structure). Subsequently, the AME 108 sends the device/user identifier(s) 124 to corresponding partner database proprietors (e.g., the partner database proprietors 104a-b) to receive user information (e.g., the user information 102a-b) corresponding to the device/user identifier(s) 124 from the partner database proprietors 104a-b so that the AME 108 can associate the user information with corresponding media impressions of media (e.g., the media 118) presented at mobile devices (e.g., the client device 106).

In some examples, to protect the privacy of the user of the client device 106, the media identifier 122 and/or the device/ user identifier(s) 124 are encrypted before they are sent to the AME 108 and/or to the partner database proprietors 104a-b. In other examples, the media identifier 122 and/or the device/user identifier(s) 124 are not encrypted.

After the AME 108 receives the device/user identifier(s) 124, the AME 108 sends device/user identifier logs 136a-b to corresponding partner database proprietors (e.g., the partner database proprietors 104a-b). In some examples, each of the device/user identifier logs 136a-b includes a single device/user identifier. In some examples, some or all of the device/user identifier logs 136a-b include numerous aggregate device/user identifiers received at the AME 108 over time from one or more mobile devices. After receiving the device/user identifier logs 136a-b, each of the partner database proprietors 104a-b looks up its users corresponding to the device/user identifiers 124 in the respective logs 136a-b. In this manner, each of the partner database proprietors 104a-b collects user information 102a-b corresponding to users identified in the device/user identifier logs 136a-b for sending to the AME 108. For example, if the partner database proprietor 104a is a wireless service provider and the device/user identifier log 136a includes IMEI numbers recognizable by the wireless service provider, the wireless service provider accesses its subscriber records to find users having IMEI numbers matching the IMEI numbers received in the device/user identifier log 136a. When the users are identified, the wireless service provider copies the users' user information to the user information 102a for delivery to the AME 108.

In some other examples, the example data collector 112 sends the device/user identifier(s) 124 from the client device 106 to the app publisher 110 in the collected data 126, and it also sends the device/user identifier(s) 124 to the media publisher 120. In such other examples, the data collector 112 does not collect the media ID 122 from the media 118 at the client device 106 as the data collector 112 does in the example system 100 of FIG. 1. Instead, the media publisher 120 that publishes the media 118 to the client device 106 retrieves the media ID 122 from the media 118 that it publishes. The media publisher 120 then associates the media ID 122 to the device/user identifier(s) 124 received from the data collector 112 executing in the client device 106, and sends collected data 138 to the app publisher 110 that includes the media ID 122 and the associated device/user identifier(s) 124 of the client device 106. For example, when the media publisher 120 sends the media 118 to the client device 106, it does so by identifying the client device 106 as a destination device for the media 118 using one or more of the device/user identifier(s) 124 received from the client device 106. In this manner, the media publisher 120 can associate the media ID 122 of the media 118 with the device/user identifier(s) 124 of the client device 106 indicating that the media 118 was sent to the particular client device 106 for presentation (e.g., to generate an impression of the media 118).

Alternatively, in some other examples in which the data collector 112 is configured to send the device/user identifier(s) 124 to the media publisher 120, and the data collector 112 does not collect the media ID 122 from the media 118 at the client device 106, the media publisher 102 sends impression data 130 to the AME 108. For example, the media publisher 120 that publishes the media 118 to the client device 106 also retrieves the media ID 122 from the media 118 that it publishes, and associates the media ID 122 with the device/user identifier(s) 124 of the client device 106. The media publisher 120 then sends the media impression data 130, including the media ID 122 and the device/user identifier(s) 124, to the AME 108. For example, when the media publisher 120 sends the media 118 to the client device 106, it does so by identifying the client device 106 as a destination device for the media 118 using one or more of the device/user identifier(s) 124. In this manner, the media publisher 120 can associate the media ID 122 of the media 118 with the device/user identifier(s) 124 of the client device 106 indicating that the media 118 was sent to the particular client device 106 for presentation (e.g., to generate an impression of the media 118). In the illustrated example, after the AME 108 receives the impression data 130 from the media publisher 120, the AME 108 can then send the device/user identifier logs 136a-b to the partner database proprietors 104a-b to request the user information 102a-b as described above.

Although the media publisher 120 is shown separate from the app publisher 110 in FIG. 1, the app publisher 110 may implement at least some of the operations of the media publisher 120 to send the media 118 to the client device 106 for presentation. For example, advertisement providers, media providers, or other information providers may send media (e.g., the media 118) to the app publisher 110 for publishing to the client device 106 via, for example, the app program 116 when it is executing on the client device 106. In such examples, the app publisher 110 implements the operations described above as being performed by the media publisher 120.

Additionally or alternatively, in contrast with the examples described above in which the client device 106 sends identifiers to the audience measurement entity 108 (e.g., via the application publisher 110, the media publisher 120, and/or another entity), in other examples the client device 106 (e.g., the data collector 112 installed on the client device 106) sends the identifiers (e.g., the user/device identifier(s) 124) directly to the respective database proprietors 104a, 104b (e.g., not via the AME 108). In such examples, the example client device 106 sends the media identifier 122 to the audience measurement entity 108 (e.g., directly or through an intermediary such as via the application publisher 110), but does not send the media identifier 122 to the database proprietors 104a-b.

As mentioned above, the example partner database proprietors 104a-b provide the user information 102a-b to the example AME 108 for matching with the media identifier 122 to form media impression information. As also mentioned above, the database proprietors 104a-b are not provided copies of the media identifier 122. Instead, the client device 106 provides the database proprietors 104a-b with impression identifiers 140. An impression identifier 140 uniquely identifies an impression event relative to other impression events of the client device 106 so that an occurrence of an impression at the client device 106 can be distinguished from other occurrences of impressions. However, the impression identifier 140 does not itself identify the media associated with that impression event. In such examples, the impression data 130 from the client device 106 to the AME 108 also includes the impression identifier 140 and the corresponding media identifier 122. To match the user information 102a-b with the media identifier 122, the example partner database proprietors 104a-b provide the user information 102a-b to the AME 108 in association with the impression identifier 140 for the impression event that triggered the collection of the user information 102a-b. In this manner, the AME 108 can match the impression identifier 140 received from the client device 106 via the impression data 130 to a corresponding impression identifier 140 received from the partner database proprietors 104a-b via the user information 102a-b to associate the media identifier 122 received from the client device 106 with demographic information in the user information 102a-b received from the database proprietors 104a-b.

The impression identifier 140 of the illustrated example is structured to reduce or avoid duplication of audience member counts for audience size measures. For example, the example partner database proprietors 104a-b provide the user information 102a-b and the impression identifier 140 to the AME 108 on a per-impression basis (e.g., each time a client device 106 sends a request including an encrypted identifier 208a-b and an impression identifier 140 to the partner database proprietor 104a-b) and/or on an aggregated basis. When aggregate impression data is provided in the user information 102a-b, the user information 102a-b includes indications of multiple impressions (e.g., multiple impression identifiers 140) at mobile devices. In some examples, aggregate impression data includes unique audience values (e.g., a measure of the quantity of unique audience members exposed to particular media), total impression count, frequency of impressions, etc. In some examples, the individual logged impressions are not discernable from the aggregate impression data.

As such, it is not readily discernable from the user information 102a-b whether instances of individual user-level impressions logged at the database proprietors 104a, 104b correspond to the same audience member such that unique audience sizes indicated in the aggregate impression data of the user-information 102a-b are inaccurate for being based on duplicate counting of audience members. However, the impression identifier 140 provided to the AME 108 enables the AME 108 to distinguish unique impressions and avoid overcounting a number of unique users and/or devices accessing the media. For example, the relationship between the user information 102a from the partner A database proprietor 104a and the user information 102b from the partner B database proprietor 104b for the client device 106 is not readily apparent to the AME 108. By including an impression identifier 140 (or any similar identifier), the example AME 108 can associate user information corresponding to the same user between the user information 102a-b based on matching impression identifiers 140 stored in both of the user information 102a-b. The example AME 108 can use such matching impression identifiers 140 across the user information 102a-b to avoid overcounting mobile devices and/or users (e.g., by only counting unique users instead of counting the same user multiple times).

A same user may be counted multiple times if, for example, an impression causes the client device 106 to send multiple user/device identifiers to multiple different database proprietors 104a-b without an impression identifier (e.g., the impression identifier 140). For example, a first one of the database proprietors 104a sends first user information 102a to the AME 108, which signals that an impression occurred. In addition, a second one of the database proprietors 104b sends second user information 102b to the AME 108, which signals (separately) that an impression occurred. In addition, separately, the client device 106 sends an indication of an impression to the AME 108. Without knowing that the user information 102a-b is from the same impression, the AME 108 has an indication from the client device 106 of a single impression and indications from the database proprietors 104a-b of multiple impressions.

To avoid overcounting impressions, the AME 108 can use the impression identifier 140. For example, after looking up user information 102a-b, the example partner database proprietors 104a-b transmit the impression identifier 140 to the AME 108 with corresponding user information 102a-b. The AME 108 matches the impression identifier 140 obtained directly from the client device 106 to the impression identifier 140 received from the database proprietors 104a-b with the user information 102a-b to thereby associate the user information 102a-b with the media identifier 122 and to generate impression information. This is possible because the AME 108 received the media identifier 122 in association with the impression identifier 140 directly from the client device 106. Therefore, the AME 108 can map user data from two or more database proprietors 104a-b to the same media exposure event, thus avoiding double counting.

Each unique impression identifier 140 in the illustrated example is associated with a specific impression of media on the client device 106. The partner database proprietors 104a-b receive the respective user/device identifiers 124 and generate the user information 102a-b independently (e.g., without regard to others of the partner database proprietors 104a-b) and without knowledge of the media identifier 122 involved in the impression. Without an indication that a particular user demographic profile in the user information 102a (received from the partner database proprietor 104a) is associated with (e.g., the result of) the same impression at the client device 106 as a particular user demographic profile in the user information 102b (received from the partner database proprietor 104b independently of the user information 102a received from the partner database proprietor 104a), and without reference to the impression identifier 140, the AME 108 may not be able to associate the user information 102a with the user information 102b and/or cannot determine that the different pieces of user information 102a-b are associated with a same impression and could, therefore, count the user information 102a and the user information 102b as corresponding to two different users/devices and/or two different impressions.

The above examples illustrate methods and apparatus for collecting impression data at an audience measurement entity (or other entity). The examples discussed above may be used to collect impression information for any type of media, including static media (e.g., advertising images), streaming media (e.g., streaming video and/or audio, including content, advertising, and/or other types of media), and/or other types of media. For static media (e.g., media that does not have a time component such as images, text, a webpage, etc.), the example AME 108 records an impression once for each occurrence of the media being presented, delivered, or otherwise provided to the client device 106. For streaming media (e.g., video, audio, etc.), the example AME 108 measures demographics for media occurring over a period of time. For example, the AME 108 (e.g., via the app publisher 110 and/or the media publisher 120) provides beacon instructions to a client application or client software (e.g., the OS 114, the web browser 117, the app 116, etc.) executing on the client device 106 when media is loaded at client application/software 114-117. In some examples, the beacon instructions are embedded in the streaming media and delivered to the client device 106 via the streaming media. In some examples, the beacon instructions cause the client application/software 114-117 to transmit a request (e.g., a pingback message) to an impression monitoring server 132 at regular and/or irregular intervals (e.g., every minute, every 30 seconds, every 2 minutes, etc.). The example impression monitoring server 132 identifies the requests from the web browser 117 and, in combination with one or more database proprietors, associates the impression information for the media with demographics of the user of the web browser 117.

In some examples, a user loads (e.g., via the browser 117) a web page from a web site publisher, in which the web page corresponds to a particular 60-minute video. As a part of or in addition to the example web page, the web site publisher causes the data collector 112 to send a pingback message (e.g., a beacon request) to a beacon server 142 by, for example, providing the browser 117 with beacon instructions. For example, when the beacon instructions are executed by the example browser 117, the beacon instructions cause the data collector 112 to send pingback messages (e.g., beacon requests, HTTP requests, pings) to the impression monitoring server 132 at designated intervals (e.g., once every minute or any other suitable interval). The example beacon instructions (or a redirect message from, for example, the impression monitoring server 132 or a database proprietor 104a-b) further cause the data collector 112 to send pingback messages or beacon requests to one or more database proprietors 104a-b that collect and/or maintain demographic information about users. The database proprietor 104a-b transmits demographic information about the user associated with the data collector 112 for combining or associating with the impression determined by the impression monitoring server 132. If the user closes the web page containing the video before the end of the video, the beacon instructions are stopped, and the data collector 112 stops sending the pingback messages to the impression monitoring server 132. In some examples, the pingback messages include timestamps and/or other information indicative of the locations in the video to which the numerous pingback messages correspond. By determining a number and/or content of the pingback messages received at the impression monitoring server 132 from the client device 106, the example impression monitoring server 132 can determine that the user watched a particular length of the video (e.g., a portion of the video for which pingback messages were received at the impression monitoring server 132).

The client device 106 of the illustrated example executes a client application/software 114-117 that is directed to a host website (e.g., www.acme.com) from which the media 118 (e.g., audio, video, interactive media, streaming media, etc.) is obtained for presenting via the client device 106. In the illustrated example, the media 118 (e.g., advertisements and/or content) is tagged with identifier information (e.g., a media ID 122, a creative type ID, a placement ID, a publisher source URL, etc.) and a beacon instruction. The example beacon instruction causes the client application/software 114-117 to request further beacon instructions from a beacon server 142 that will instruct the client application/software 114-117 on how and where to send beacon requests to report impressions of the media 118. For example, the example client application/software 114-117 transmits a request including an identification of the media 118 (e.g., the media identifier 122) to the beacon server 142. The beacon server 142 then generates and returns beacon instructions 144 to the example client device 106. Although the beacon server 142 and the impression monitoring server 132 are shown separately, in some examples the beacon server 142 and the impression monitoring server 132 are combined. In the illustrated example, beacon instructions 144 include URLs of one or more database proprietors (e.g., one or more of the partner database proprietors 104a-b) or any other server to which the client device 106 should send beacon requests (e.g., impression requests). In some examples, a pingback message or beacon request may be implemented as an HTTP request. However, whereas a transmitted HTTP request identifies a webpage or other resource to be downloaded, the pingback message or beacon request includes the audience measurement information (e.g., ad campaign identification, content identifier, and/or device/user identification information) as its payload. The server to which the pingback message or beacon request is directed is programmed to log the audience measurement data of the pingback message or beacon request as an impression (e.g., an ad and/or content impression depending on the nature of the media tagged with the beaconing instructions). In some examples, the beacon instructions received with the tagged media 118 include the beacon instructions 144. In such examples, the client application/software 114-117 does not need to request beacon instructions 144 from a beacon server 142 because the beacon instructions 144 are already provided in the tagged media 118.

When the beacon instructions 144 are executed by the client device 106, the beacon instructions 144 cause the client device 106 to send beacon requests (e.g., repeatedly at designated intervals) to a remote server (e.g., the impression monitoring server 132, the media publisher 120, the database proprietors 104a-b, or another server) specified in the beacon instructions 144. In the illustrated example, the specified server is a server of the audience measurement entity 108, namely, at the impression monitoring server 132. The beacon instructions 144 may be implemented using Javascript or any other types of instructions or script executable via a client application (e.g., a web browser) including, for example, Java, HTML, etc.

Figure 2:
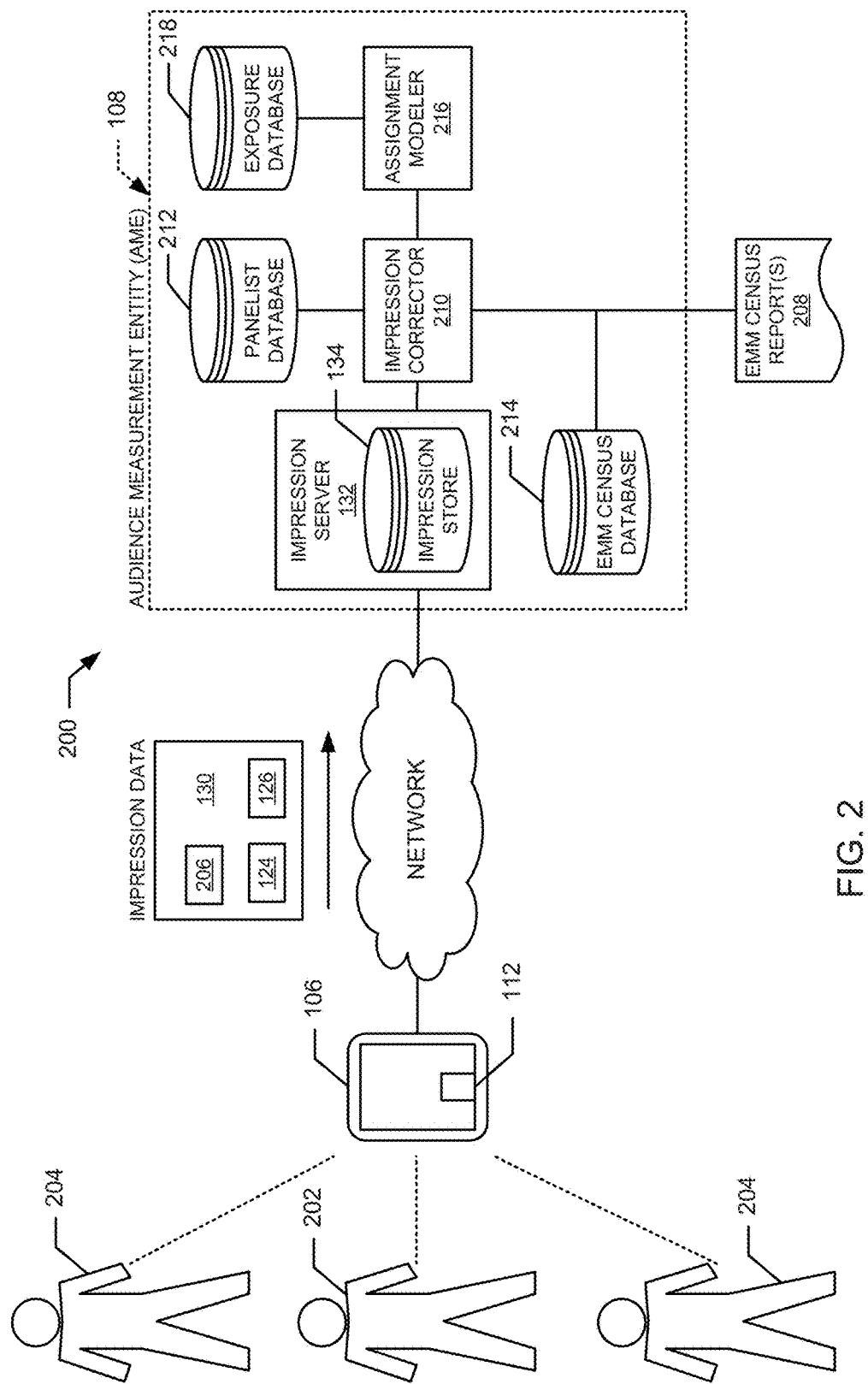
FIG. 2 is an example system to collect impressions of media presented at mobile devices and to correct the impression data for misattribution errors.

FIG. 2 illustrates an example system 200 to verify and/or correct impression data 130 corresponding to media accessed on mobile devices 106 of panelist households. In the illustrated example, the system 200 generates corrected demographic impressions used to generate and/or calibrate correction factors to correct misattribution errors in aggregate census data provided by the partner database proprietors (e.g., the partner database proprietors 104a, 104b of FIG. 1). In the illustrated example, the system 200 collects impression data 130 from one or more mobile devices, one of which is shown as the mobile device 106. The system 200 of the illustrated example uses the impression data 130 to create demographic impression data corresponding to media accessed via the mobile device 106.

In the illustrated example, the mobile device 106 is used by multiple users (e.g., a primary user 202, one or more secondary users 204, etc.). In the illustrated example, the primary user 202 is a member of an electronic mobile panel (EMM) formed and maintained by the AME 108 and the secondary users 204 are members of the same household as the primary user 202. In the illustrated example, when the AME 108 enrolls the primary user 202 as an EMM panelist, the AME 108 collects detailed demographic information (e.g., age, gender, occupation, salary, race and/or ethnicity, marital status, highest completed education, current employment status, etc.) about the primary user 202. In the illustrated example, when the primary user 202 is enrolled as an EMM panelist or at any later date, the AME 108 also collects supplemental information (sometime referred to herein as a "supplemental survey") from the primary user 202. The supplemental information may include detailed demographic information of the secondary users 204, information regarding mobile device(s) 106 in the household (e.g., types of device(s), device identifier(s), etc.), information regarding usage habits of the mobile device(s) 106 (e.g., which member of the household uses which mobile device, whether mobile device(s) 106 is/are shared, etc.), information regarding usage of database proprietors (e.g., which members of the household use which services, etc.), etc. In some examples, the AME 108 assigns an EMM panelist identifier 206 to the primary user 202.

The system 200 uses device/user identifier(s) 124 and/or the EMM panelist identifier 206 included with the impression data 130 to identify impression data 130 for media accessed on a mobile device 106 known to belong to the primary user 202. In some examples, the AME 108 may set a cookie value on the mobile device 106 when the primary user 202 logs into a service of the AME 108 using credentials (e.g., username and password) corresponding to the primary user 202. In some examples, the device/user identifier(s) 124 corresponding to the mobile device 106 and/or the primary user 202 may be supplied to the AME 108 when the primary user enrolls as an EMM panelist. In some examples, the AME 108 may supply a meter or data collector (e.g., the data collector 112 of FIG. 1) integrated into one or more media viewing apps on the mobile device which provide impression data to the AME 108 with the panelist identifier 206 assigned to the primary user 202. In the illustrated example the AME 108 uses the device/user identifier(s) 124 and/or the EMM panelist identifier 206 to pair the impression data 130 with the demographic data of the primary user 202.

In some instances, the mobile device 106 is shared with one or both of the secondary users 204. In some examples, when a secondary user 204 uses the mobile device 106, the impression data 130 reported by the device 106 includes identifier(s) (e.g., the cookie value, the device/user identifier(s) 124, the EMM panelist identifier 206, etc.) corresponding to the primary user 202. In such examples, the AME 108 incorrectly attributes an impression based on the received impression data 130 to the primary user 202 based on the included identifier(s). This creates a misattribution error because the logged impression corresponds to the secondary user 204 but is logged in association with the demographic information of the primary user 202. The example system 200 of FIG. 2 is configured to correct logged impressions for such misattribution errors.

In the illustrated example of FIG. 2, the impression server 132 logs impressions based on the impression data 130 in connection with demographic information supplied by the primary user 202 (e.g., the EMM panelist) to generate electronic mobile measurement census (EMMC) data.

The AME 108 of the illustrated example of FIG. 2 includes an impression corrector 210 to verify and/or correct demographic information paired with impression data 130 originating from mobile devices 106 of EMM panelists 202 to produce corrected EMM census data (e.g., AAM-adjusted EMM census data). The example AME 108 maintains a panelist database 212 to store information (e.g., demographic information of the EMM panelist 202, supplemental survey data, EMM panelist ID(s), device IDs, etc.) related to the EMM panelist 202 and the mobile device 106. The example impression corrector 210 uses the information stored in the panelist database 212 to determine whether the impression data 130 was misattributed to the EMM panelist 202 and, if so, which secondary user's 204 demographic information should be associated with the impression data 130 instead. After the impression data 130 is verified and/or corrected by the impression corrector 210, the AAM-adjusted EMM census data is stored in the EMM census database 214. In some examples, the AAM-adjusted EMM census data in the EMMC database 214 is used to generate an EMM census report 208 and/or is used to calibrate misattribution correction factors that can be used to correct aggregate impression data provided by database proprietors such as the user information 102*a-b* provided by the database proprietors 104*a-b* of FIG. 1.

The example AME 108 includes an assignment modeler 216 to generate an activity assignment model for use by the impression corrector 210 to calculate probability scores used to verify and/or correct demographic information paired with the impression data 130 of EMM panelists 202 in the impressions store 134. A probability score represents the probability that a person (e.g., the EMM panelist 202, the household members 204, etc.) with certain attributes (e.g., demographic information) accessed a television program with certain attributes. The example assignment modeler 216 retrieves historic exposure data stored in a exposure database 218 to generate the activity assignment model. In some examples, the historic exposure data stored in the exposure database 218 includes historic television exposure census data and/or historic EMM census data. In some examples, from time to time (e.g., aperiodically, every six months, every year, etc.), the assignment modeler 216 regenerates the activity assignment model with more current historic data. As a result, the exposure database 218 may only retain exposure data for a limited number (e.g., two, four, etc.) of television seasons (e.g., the fall season and the spring season, etc.).

In some examples, to generate the activity assignment model, the assignment modeler 216 retrieves the census data stored in the exposure database 218 and selects a majority portion (e.g., 65%, 80%, etc.) of the census data to be one or more training datasets. In such examples, the remaining portion (e.g., 35%, 20%, etc.) is designated as a validation set. In some examples, the census data stored in the exposure database 218 may be split into a number of subsets (e.g., five subsets with 20% of the census data, etc.). In some such examples, one subset may be selected as the validation set and the remaining subsets form the training set. In some such examples, the activity model may be trained and validated multiple times (e.g., cross-validated with different subsets being the validation subset).

In the illustrated examples of FIG. 2, the example assignment modeler 216 selects attributes associated with the census data (e.g., demographic information, day of the week, program genre, program locality (e.g., nation, local, etc.), etc.) and generates the activity assignment model using modeling techniques, such as a gradient boost regression modeling technique, a k-nearest neighbor modeling technique, etc. In some examples, different activity assignment models may be generated for different localities (e.g., local broadcast, national, etc.). For example, the assignment modeler 216 may generate a local activity assignment model for local television programing and a national activity assignment model for nation television programming. In some examples, the assignment modeler 216 determines an accuracy of the activity assignment model by running the validation set through the activity assignment model and then comparing the probability scores of members of the households in the validation set as calculated by the activity assignment model with the actual members of the households contained in the validation set. For example, for a particular probability score calculation performed using the activity assignment model, the activity assignment model is considered correct or acceptable if the member of a household with the highest probability score calculated using the activity assignment model matches the actual member of the household identified by the corresponding record in the validation set. In some examples, the activity assignment model is accepted if the accuracy of the activity assignment model satisfies (e.g., is greater than or equal to) a threshold (e.g., 50%, 65%, etc.). In such examples, if the accuracy of the activity assignment model does not satisfy the threshold, the activity assignment model is regenerated by the assignment modeler 216 using a different combination of attributes.

The example impression corrector 210 uses the activity assignment model to calculate probability scores. The calculated probability scores are used to determine whether the demographic information of the EMM panelist 202 is correctly associated with the impression data 130 in the impression store 134, or whether demographic information of one of the other members of the household 204 should be assigned to the impression data 130 instead. In the illustrated example, a probability score (Ps) is calculated in accordance with Equation 1 below.

$$P_{Sh} = AAM(A_{1h}, A_{2h}, A_{3h}, \ldots A_{nh}),$$ Equation 1

In Equation 1 above, $P_{Sh}$ is the probability score that household member (e.g., the household members 202, 204) h is the person corresponding to a particular impression, AAM is the activity assignment model, and $A_{1h}$ through $A_{nh}$ are the attributes of the household member h and attributes of the program associated with the impression data 130 that correspond to the attributes used to generate the activity assignment model (AAM).

Figure 3:
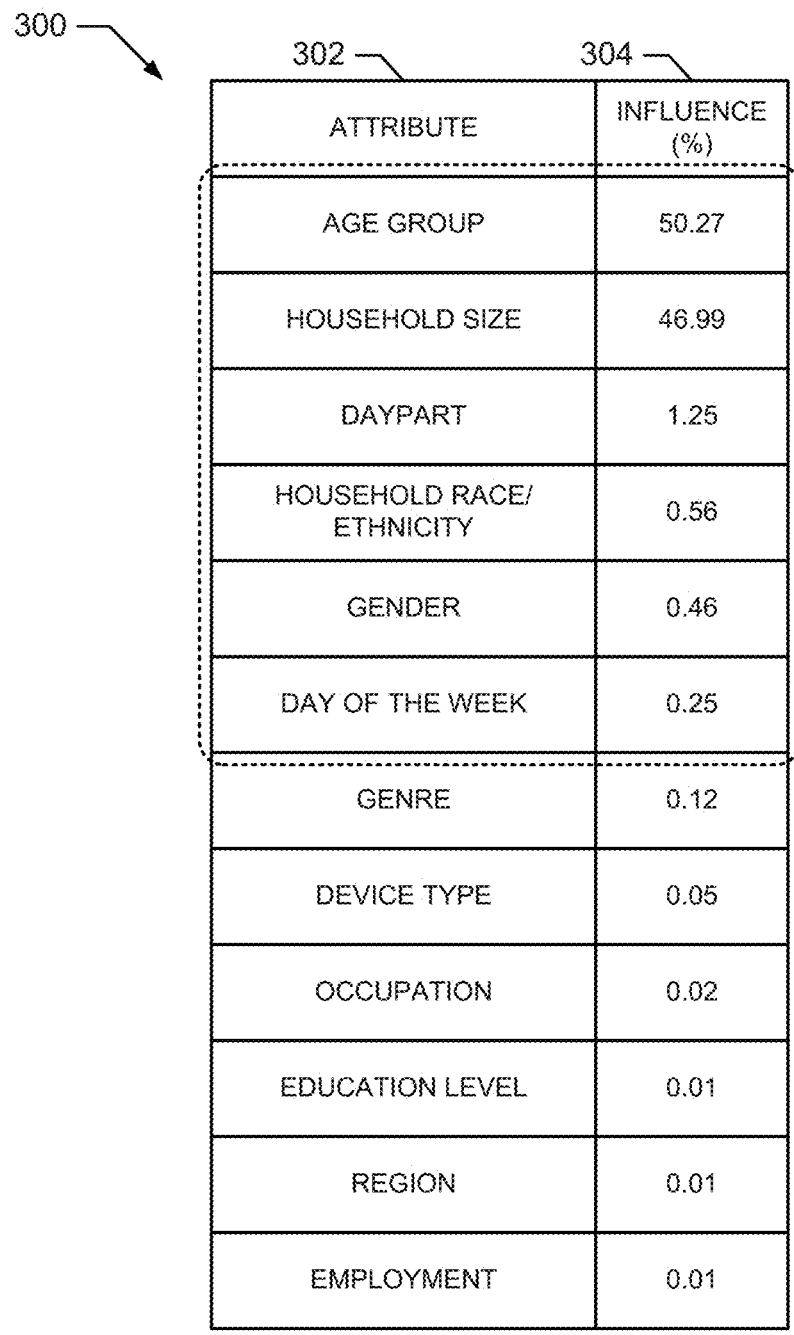
FIG. 3 illustrates an example table depicting attributes used to generate the example activity assignment model of FIG. 2.

FIG. 3 illustrates an example table 300 depicting attributes 302 used to generate the activity assignment model. The example table 300 also includes example influence values 304 (e.g., influence weights) for corresponding attributes 302 that indicate how much influence each attribute 302 contributes in the activity assignment model. The example influence 304 is calculated after the activity assignment model is generated by the assignment modeler 216 (FIG. 2). In the illustrated example of FIG. 3, the influence 304 is a relative value (e.g., the sum of all of the influences 304 is 100%) that is used to remove attributes from the activity assignment model. A higher influence value 304 indicates that a corresponding attribute 302 has a higher influence on the probability score (but does not show how a particular attribute contributes to an individual probability score). For example, if an attribute 302 has a corresponding influence value 304 of 52%, then the value of the attribute 302 has a determinative effect in 52% of the probability scores. In some examples, the attributes 302 with the highest influence values 304 are retained in the activity assignment model. In some examples, after selecting the attributes 302 with the highest influence values 304, the assignment modeler 216 regenerates the activity assignment model using the selected attributes 302. In the illustrated example of FIG. 3, the six attributes 302 with the highest influence values 304 (e.g., age group, household size, daypart, household race/ethnicity, gender, day of the week) are selected for the activity assignment model. The attributes 302 may be selected by, for example, selecting a number of attributes 302 with the highest influence 304, or by selecting a number of attributes 302 that add up to a threshold percentage of influence 304, or by using any other suitable selection technique by which selections of attributes 302 contribute to generating an activity assignment model of a desired performance.

Returning to the illustrated example of FIG. 2, after generating the activity assignment model, the example assignment modeler 216 evaluates the activity assignment model with the validation set. If accuracy of the activity assignment model satisfies a threshold, the assignment modeler 216 provides the activity assignment model to the impression corrector 210. If accuracy of the activity assignment model does not satisfy the threshold, the assignment modeler 216 selects a different combination of attributes (e.g., the attributes 300 of FIG. 3), and regenerates and revalidates the activity assignment model. In some examples, the threshold is based on an error tolerance of customers of the AME 108 and/or a known amount of error in the training data set.

Figure 4:
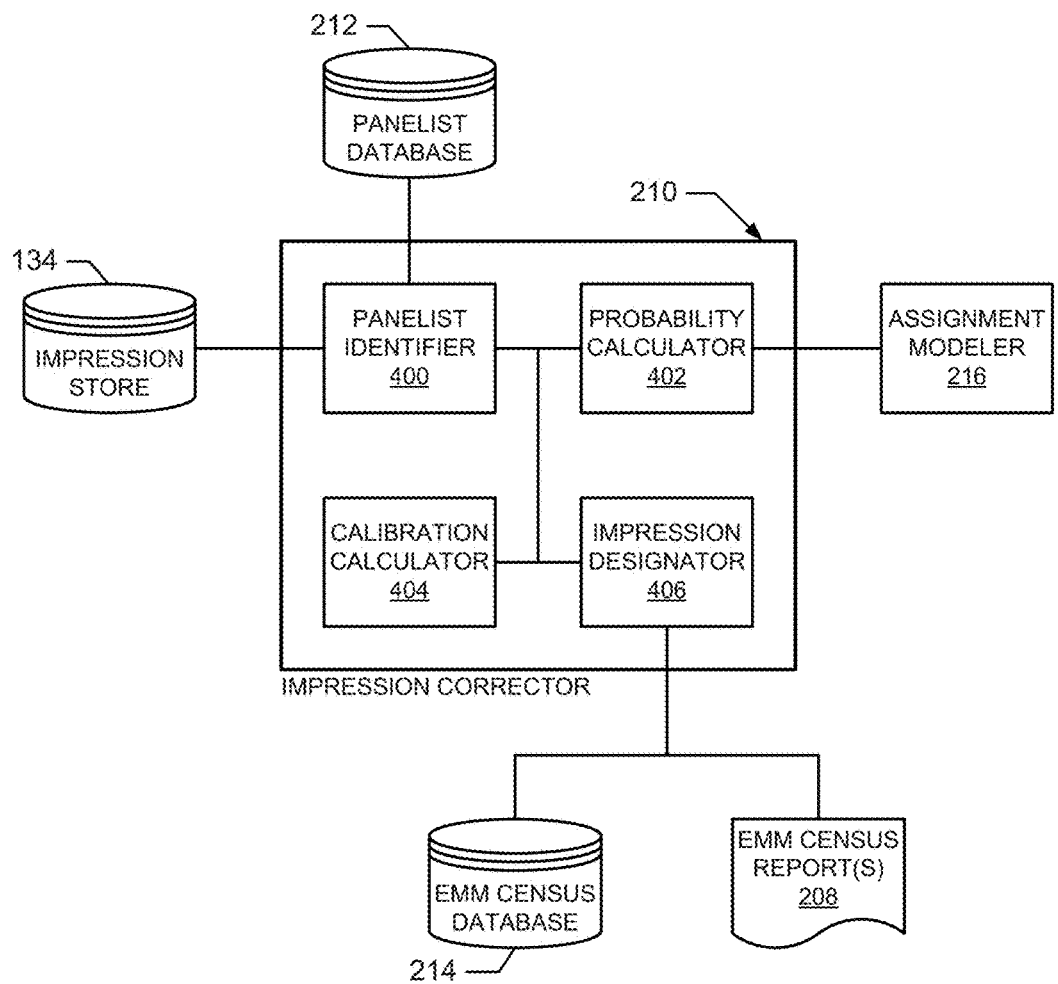
FIG. 4 illustrates an example implementation of the example impression corrector of FIG. 2 to associate a member of a panelist household to a logged impression collected from a mobile device in the same panelist household.

FIG. 4 illustrates an example implementation of the example impression corrector 210 of FIG. 2 to verify and/or correct demographic information associated with the impression data 130 (FIG. 1) generated by a mobile device 106 (FIG. 1) belonging to the EMM panelist 202 (FIG. 2). The example impression corrector 210 includes an example panelist identifier 400, an example probability calculator 402, an example calibration calculator 404, and an example impression designator 406. The example panelist identifier 400 retrieves impression data 130 from the impression store 134. Using a user/device identifier 126 (FIG. 1) and/or an EMM panelist ID 206 (FIG. 2) included in the retrieved impression data 130, the example panelist identifier 400 retrieves demographic data for the EMM panelist 202 and the other household member(s) 204. The example panelist identifier 400 also uses the user/device identifier 126 to retrieve device information (e.g., device type, etc.) of the client device 106 from the panelist database 212.

In the illustrated example of FIG. 4, the calibration calculator 404 calculates a calibration factor (λ) for the EMM panelist 204. The calibration factor (λ) is used to determine the likelihood that the EMM panelist 202 was exposed to the media associated with the retrieved impression data 130. Calibration factors (λ) greater than one (λ>1) signify that the EMM panelist 202 is more likely to be the person associated with the impression data 130 compared to the other household members 204. Calibration factors (λ) less than one (λ<1) mean that the EMM panelist 202 is less likely to be the person associated with the impression data 130 compared to the other household members 204. Calibration factors (λ) equal to one (λ=1) mean that the EMM panelist 202 is as likely to be the person associated with the impression data 130 as the other household members 204.

The calibration factor (λ) is based on the demographic group of the EMM panelist 204 and the type of portable device 106 on which the media was accessed. The demographic groups are defined by demographic information, genre of the media presentation and/or type of mobile device. For example, one demographic group may be "Hispanic, female, age 30-34, iPad® tablet device" while another demographic group may be "Hispanic, female, age 30-34, Android™ smartphone device." In the illustrated example, a calibration factor (λ) is calculated using Equation 2 below.

$$\lambda = \frac{T_{AVG}(\text{EMM panelist demo group})}{T_{AVG}(\text{all demo groups})},$$ Equation 2

In Equation 2 above, $T_{AVG}$(EMM panelist demo group) is the average time the EMM panelist's demographic (demo) group is exposed to the media presentation or media genre associated with the impression data 130, and $T_{AVG}$(all demo groups) is the average time across all demographic (demo) groups associated with exposure to the media presentation or media genre associated with the impression data 130. For example, if the $T_{AVG}$(Hispanic, female, age 30-34, iPad® tablet device) is 0.5 hours and the $T_{AVG}$(all demo groups) is 0.34 hours, the calibration factor would be 1.47 (0.5/0.34=1.47).

The example probability calculator 402 receives or retrieves the household information and the device information from the panelist identifier 400. In some examples, the probability calculator 402 first determines whether the EMM panelist 202 is to be attributed to the exposure of the media associated with the impression data 130 before calculating a probability score for any other member of the household 204. In some such examples, the probability calculator 402 determines that the EMM panelist 202 is to be attributed to the exposure if (i) the EMM panelist 202 is the only member of the household, (ii) the EMM panelist 202 has indicated (e.g., when recruited as a panelist, on a supplemental survey, etc.) that the particular portable device 106 is not shared, or (iii) if the probability score of the EMM panelist 202 ($P_{Sp}$) satisfies the criterion indicated in Equation 3 below.

$$P_{Sp} \geq \frac{\lambda}{HH} \qquad \text{Equation 3}$$

In Equation 3 above, HH is the size of the EMM panelist's 204 household. For example, if the probability score ($P_{Sp}$) of the EMM panelist 204, as calculated by the activity assignment model, is 0.42, the calibration factor ($\lambda$) is 1.47, and the size of the household (HH) is 4, the probability calculator 402 confirms the EMM panelist 202 is to be attributed to the exposure (0.42≥1.47/4).

In the illustrated example of FIG. 4, if the probability calculator 402 determines that the EMM panelist 202 is not to be attributed to the exposure, the probability calculator 402 calculates a probability score, using the activity assignment model, for every other member 204 of the EMM panelist's 202 household. In some examples, the probability calculator 402 selects the member 204 of the household with the highest probability score.

In the illustrated example of FIG. 4, the impression designator 406 replaces the demographic information associated with the impression data with the demographic information of the person (e.g., the EMM panelist 202, the member of the household 204) selected by the probability calculator 402 to form the AAM-adjusted EMM census data. The example impression designator 406 stores the AAM-adjusted EMM census data in the EMM census database 214 and/or includes the EMM census data on an EMMC report 208.

While an example manner of implementing the example impression corrector 210 of FIG. 2 is illustrated in FIG. 4, one or more of the elements, processes and/or devices illustrated in FIG. 4 may be combined, divided, re-arranged, omitted, eliminated and/or implemented in any other way. Further, the example panelist identifier 400, the example probability calculator 402, the example calibration calculator 404, the example impression designator 406 and/or, more generally, the example impression corrector 210 of FIG. 2 may be implemented by hardware, software, firmware and/or any combination of hardware, software and/or firmware. Thus, for example, any of the example panelist identifier 400, the example probability calculator 402, the example calibration calculator 404, the example impression designator 406 and/or, more generally, the example impression corrector 210 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example panelist identifier 400, the example probability calculator 402, the example calibration calculator 404, and/or the example impression designator 406 is/are hereby expressly defined to include a tangible computer readable storage device or storage disk such as a memory, a digital versatile disk (DVD), a compact disk (CD), a Blu-ray disk, etc. storing the software and/or firmware. Further still, the example impression corrector 210 of FIG. 2 may include one or more elements, processes and/or devices in addition to, or instead of, those illustrated in FIG. 4, and/or may include more than one of any or all of the illustrated elements, processes and devices.

Figure 5:
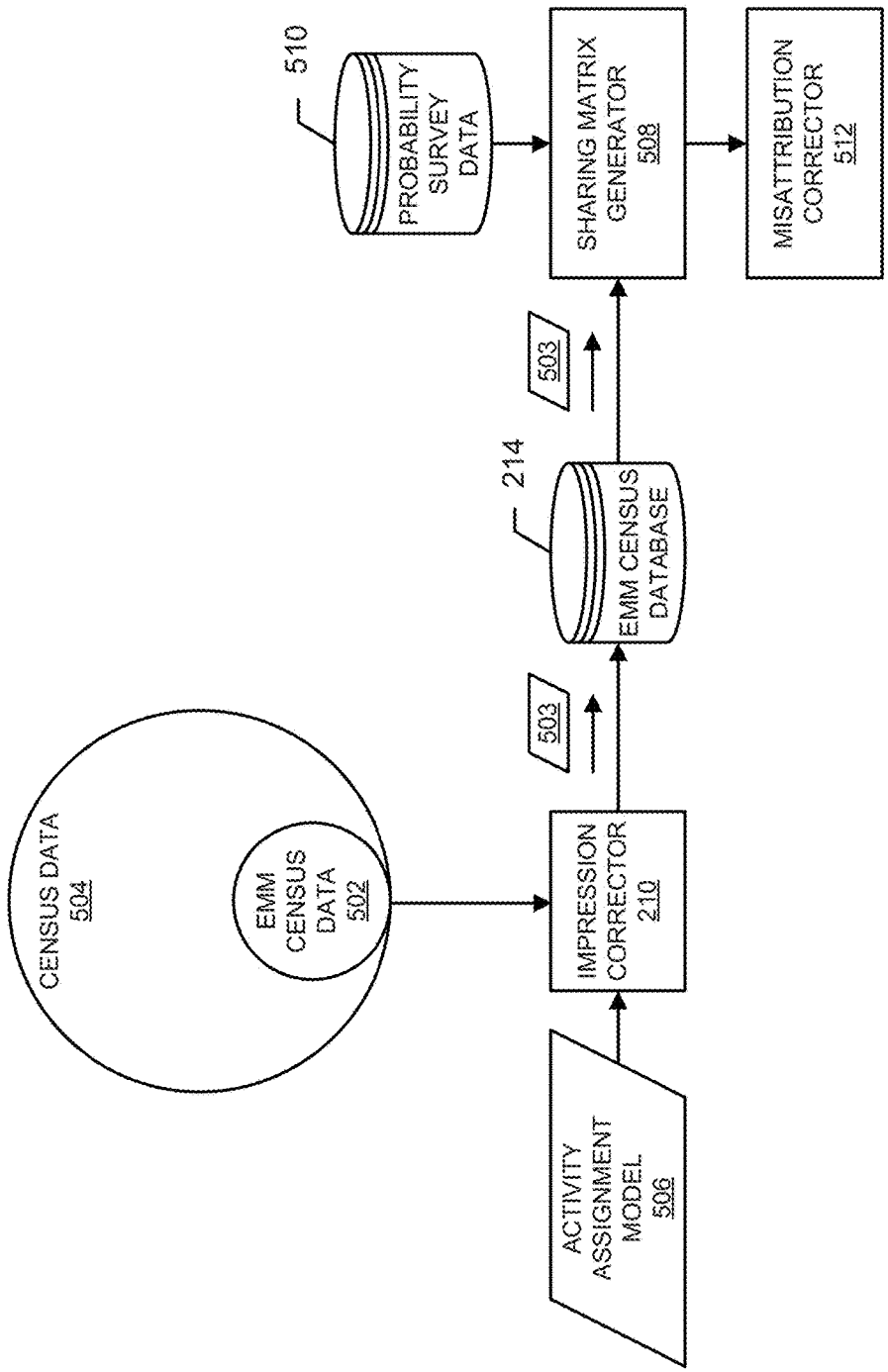
FIG. 5 depicts an example system to determine correction factors to correct impression data for misattributions errors.

FIG. 5 depicts an example system 500 to use EMM census data 502 to calibrate misattribution correction factors used to correct the misattributions associated with census data 504. In the illustrated example, the census data 504 includes census data from various sources (e.g., aggregate census data provided by database proprietors, census data from monitoring EMM panelists, etc.). The example EMM census data 502 is a subset of the census data 504 that contains census data from monitoring EMM panelists. In some examples, the EMM census data 502 is household-level impression data (e.g., impressions that are all associated with the EMM panelist of a household) and not user-level impression data (e.g., impressions that are associated with individual household members).

In the illustrated example, the impression corrector 210 uses an activity assignment model 506 (e.g., the activity assignment model generated by the assignment modeler 216 of FIG. 2) to verify and/or correct demographic data associated with EMM census data 502 to produce AAM-adjusted EMM census data 503. For example, some EMM census data 502 may be collected before the EMM panelist 202 (FIG. 2) returns a supplemental survey response to the AME 108 (FIG. 1) providing demographic information about members of the EMM panelist's household. In that example, before receiving a supplemental survey response, the impressions 130 (FIG. 1) would be associated with the EMM panelist 202, even though another household member 204 actually accessed the media. As another example, an updated supplemental survey response may be submitted by the EMM panelist 202 if usage habits of the portable device 106 (FIG. 1) change and/or if the composition of the household changes. In some examples, the EMM census data 502 may be reprocessed upon receiving a new and/or updated household demographic survey. As another example, impression data 130 may be assigned to the EMM panelist 202 that owns the mobile device 106 in an initial processing phase (e.g., when the impression request is received by the AME 108, etc.) and then may be verified and/or corrected in a post-processing phase. In the illustrated example, the AAM-adjusted EMM census data 503 is stored in the EMM census database 214.

Initially, in some examples, the example sharing matrix generator 508 calculates device sharing matrices based on probability survey data from a probability survey database 510. The probability survey is a survey conducted on randomly selected people and/or households. In some examples, the selected people and/or households are selected from panelists enrolled in one or more panels with the AME 108. Alternatively or additionally, the selected people and/or households that are not enrolled in an AME panel are randomly selected (e.g., via phone solicitations, via Internet advertisements, etc.). In some instances, the probability survey is a survey conducted on non-panelist households because panelist households are a relatively small portion of the population and the census data 504 includes demographic impressions of non-panelist households. In the illustrated example, the probability survey includes information about demographics of each member of the household, type of devices in the household, which members of the household use which devices, media viewing preferences, which members of the household are registered with which database proprietors, etc. However, the probability survey data 510 does not include detailed viewing habits of the surveyed household (e.g., which member of the household is responsible for which percentage of genre-specific media access, etc.).

To illustrate, consider the following example. An example non-panelist household from which a probability survey is conducted includes four members: 1) a 35-39 year old male, 2) a 40-44 year old female, 3) a 12-14 year old male, and 4) a 9-11 year old male. On the probability survey, the 35-39 year old male and the 12-14 year old male indicate that they have registered with an example database proprietor (e.g., Facebook, Google, Yahoo!, etc.) and access, from time to time, the database proprietor via a tablet computer (e.g., the mobile device 106 of FIG. 2). The probability survey indicates which genre of media each of the members of the household access on the tablet. Table 1 below illustrates an example exposure pattern for the tablet (e.g., an "X" indicates that the member of the family is exposed to media of that genre on the tablet).

TABLE 1

EXAMPLE EXPOSURE PATTERN FOR A TABLET BY MEDIA GENRE IN AN EXAMPLE HOUSEHOLD BASED ON PROBABILITY SURVEY DATA

| | Demographic Groups | | | |
|---|---|---|---|---|
| Content Type | M35-39 | F40-44 | M12-14 | M9-11 |
| All | X | X | X | X |
| Political | X | X | | |
| Drama | | X | | |
| Kids | | | | X |
| Comedy | X | | X | |

Using the probability survey data, the example sharing matrix generator 508 generates device sharing probabilities (sometimes referred to as probability density functions (PDFs)) that the person identified in the demographic group in the household is exposed to the type of content (e.g., media genre) on the device. Table 2 below illustrates device sharing probabilities based on the example household. Device sharing probabilities are the probability that a member of an age-based demographic group accessed a specific genre of media on the mobile device. Because the probability survey data 510 does not include detailed exposure information, in the illustrated example, the sharing matrix generator 508 assumes that the members of the household that are exposed the indicated media genre are exposed to it equally.

TABLE 2

EXAMPLE DEVICE SHARING PROBABILITIES BY MEDIA GENRE IN AN EXAMPLE HOUSEHOLD BASED ON PROBABILITY SURVEY DATA

| | Demographic Groups | | | |
|---|---|---|---|---|
| Content Type | M35-39 | F40-44 | M12-14 | M9-11 |
| All | 0.25 | 0.25 | 0.25 | 0.25 |
| Political | 0.50 | 0.50 | — | — |

TABLE 2-continued

EXAMPLE DEVICE SHARING PROBABILITIES BY MEDIA GENRE IN AN EXAMPLE HOUSEHOLD BASED ON PROBABILITY SURVEY DATA

| | Demographic Groups | | | |
|---|---|---|---|---|
| Content Type | M35-39 | F40-44 | M12-14 | M9-11 |
| Drama | — | 1.00 | — | — |
| Kids | — | — | — | 1.00 |
| Comedy | 0.50 | — | 0.50 | — |

For example, according to Table 2 above, if impression data for political media is received from the above-described household, the probability that the male age 35-39 accessed the media is 50%. However, actual sharing probabilities within a household may be different. For example, the 35-39 year old male may be exposed to 75% of the political media on the tablet, while the 40-44 year old female may only be exposed to 25% of the political media on the tablet.

To provide more detailed device sharing probabilities, the AAM-adjusted EMM census 503 data in the example EMM census database 214 contains detailed exposure information (e.g., the impressions 130 of FIG. 1) paired with detailed demographic information. To illustrate, consider the following example. An example panelist household from which AAM-adjusted EMM census data 503 is collected includes four members: 1) a 30-34 year old male, 2) a 30-34 year old female (who is the EMM panelist), 3) a 12-14 year old male, and 4) a 12-14 year old female. During the EMM panel enrollment process (e.g., via a supplemental survey), the 30-34 year old female EMM panelist indicates that a tablet computer (e.g., the device 106 of FIG. 2) is shared with the entire household.

The demographic impressions generated by the tablet are processed by the impression corrector 210 to verify and/or correct demographic information associated with the demographic impressions to produce AAM-adjusted EMM census data 503. In the illustrated example, the sharing matrix generator 508 analyzes the AAM-adjusted EMM census data 503 for the household. For example, the sharing matrix generator 508 may, for a household, retrieve the impression data in the AAM-adjusted EMM census data 503 for specific media genre (e.g., political, drama, kids, comedy, etc.). The sharing matrix generator 508 may then calculate what percentage the specific media genre was accessed by each member of the household. In such an example, the sharing matrix generator 508 may repeat this process until the percentages are calculated for each genre of interest to generate device sharing probabilities, as shown in Table 3 below.

TABLE 3

EXAMPLE DEVICE SHARING PROBABILITIES BY MEDIA GENRE IN AN EXAMPLE HOUSEHOLD BASED ON AAM-ADJUSTED EMM CENSUS DATA

| | Demographic Groups | | | |
|---|---|---|---|---|
| Content Type | M30-34 | F30-34 | M12-14 | F12-14 |
| All | 0.34 | 0.66 | — | — |
| Political | 0.75 | 0.25 | — | — |
| Drama | — | 0.91 | — | 0.09 |
| Kids | — | — | 0.56 | 0.44 |
| Comedy | 0.23 | — | 0.45 | 0.32 |

For example, according to Table 3 above, if impression data for political media is received from the above-described household, the probability that the male, age 30-34, accessed the media is 75%. As another example, if impression data for political media is received from the above described household that is associated with the female, age 12-14, 75% of such impression data should be associated with the male, age 30-34, and 25% of such impression data should be associated with the female, age 30-34, instead.

In some examples, the sharing matrix generator 508 calculates device sharing probabilities using the AAM-adjusted EMM census data 503 to calibrate the device sharing probabilities calculated for the probability surveys. For example, instead of assigning an equal probability to household members that are exposed to a particular media genre on a mobile device, the AME 108 may assign weighted probabilities of being exposed to the genre on the device based on the device sharing matrices calculated by the sharing matrix generator 508 using the AAM-adjusted EMM census data 503. In some examples, the sharing matrix generator 508 may use both of the device sharing probabilities generated based on the AAM-adjusted EMM census data 503 and the probability survey data 510 to generate misattribution correction factors. In some such examples, the device sharing probabilities may be weighted according to contribution to the misattribution correction factors. For example, if six thousand matrices of device sharing probabilities based on probability survey data 510 are used and four thousand matrices of device sharing probabilities based on the AAM-adjusted EMM census data 503, the device sharing matrixes based on probability survey data 510 would be weighted by 0.6(6,000/(6,000+4,000)), while device sharing matrixes based on the AAM-adjusted EMM census data 503 would be weighted by 0.4 (4,000/(6,000+4,000)).

Examples for using device sharing probabilities to generate correction factors to correct misattribution errors are disclosed in U.S. patent application Ser. No. 14/560,947, filed Dec. 4, 2014, entitled "Methods and Apparatus to Compensate Impression Data for Misattribution and/or Non-Coverage by a Database Proprietor," which is incorporated herein by reference in its entirety.

Figure 6:
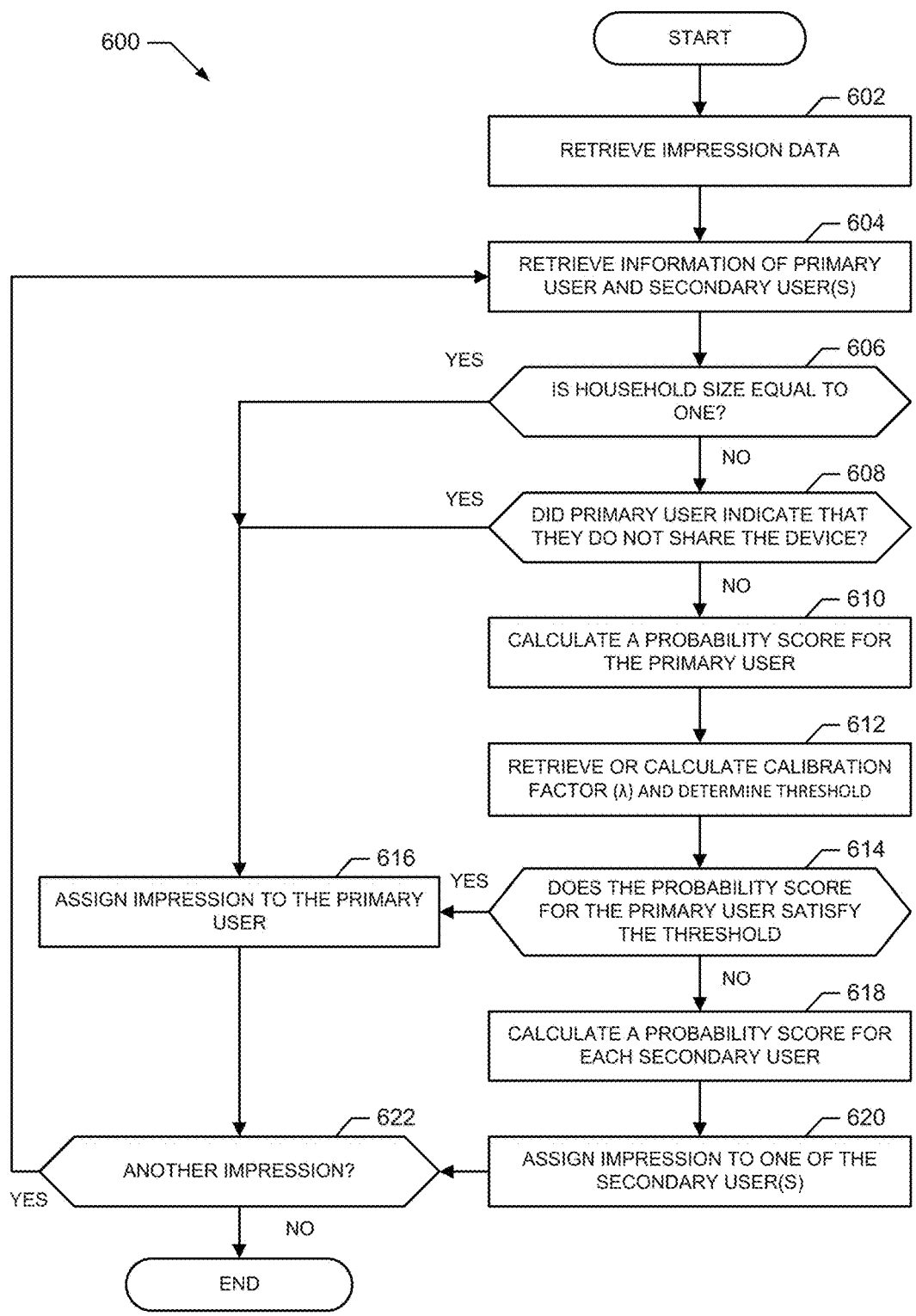
FIG. 6 is a flow diagram representative of example machine readable instructions that may be executed to implement the example impression corrector of FIGS. 2, 4, and 5 to associate a member of the panelist household to log impressions from an electronic device.
Figure 7:
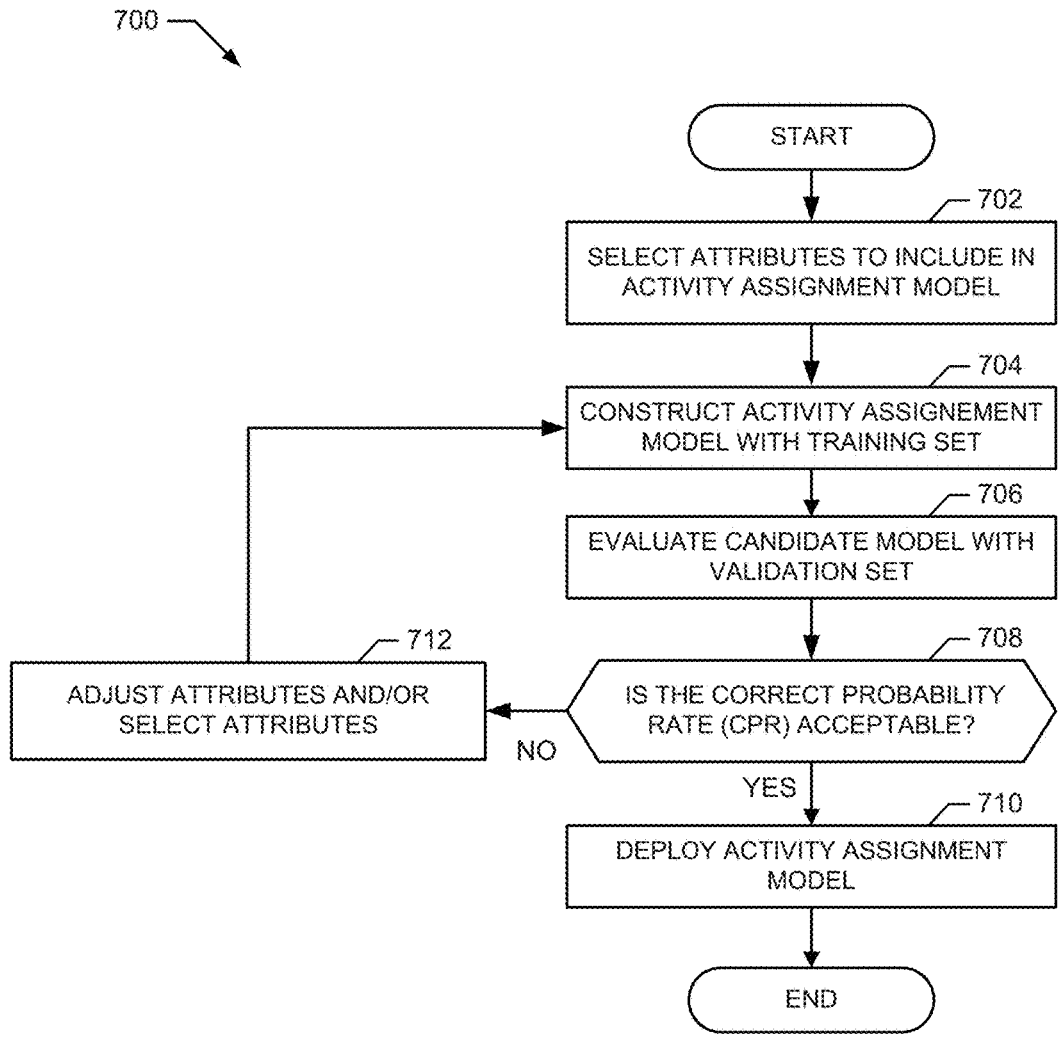
FIG. 7 is a flow diagram representative of example machine readable instructions that may be executed to implement the example assignment modeler of FIG. 2 to generate the activity assignment model.

A flowchart representative of example machine readable instructions for implementing the example impression corrector 210 of FIGS. 2, 4, and/or 5 is shown in FIG. 6. A flowchart representative of example machine readable instructions for implementing the example assignment modeler 216 of FIG. 2 is shown in FIG. 7. In these examples, the machine readable instructions comprise program(s) for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 6 and 7, many other methods of implementing the example impression corrector 210 and/or the example assignment modeler 216 may alternatively be used. For example, the order of execution of the blocks may be changed, and/or some of the blocks described may be changed, eliminated, or combined.

As mentioned above, the example processes of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flow diagram representative of example machine readable instructions 600 that may be executed to implement the example impression corrector 210 of FIGS. 2 and 4 to verify and/or correct associations of demographic information with impression data 130 (FIG. 1) collected from a portable device 106 (FIG. 1) belonging to an EMM panelist 202 (FIG. 2). Initially, at block 602, the panelist identifier 400 (FIG. 4) retrieves impression data 130 from the impressions store 134 (FIG. 1). At block 604, based on EMM panelist ID 206 (FIG. 2) and/or user/device identifier 124 (FIG. 1) included in the impression data 130 retrieved at block 602, the panelist identifier 400 retrieves information (e.g., demographic information, unique identifier, etc.) for the primary user 202 (e.g., the EMM panelist) and the secondary user(s) 204 (e.g., the members of the EMM panelist's household), and information (e.g., device type, etc.) for the portable device 106. At block 606, the probability calculator 402 (FIG. 4) determines if the size of the primary user's 202 household is equal to one (e.g., the primary user 202 lives alone). If the size of the primary user's 202 household is one, the program control advances to block 616 at which the impression designator 406 (FIG. 4) associates the demographic information of the primary user 202 with the impression data 130 to create AAM-adjusted EMM census data 503 (FIG. 5). Otherwise, if the size of the primary user's 202 household is not one, program control advances to block 608.

At block 608, the probability calculator 402 determines if the primary user 202 indicated that he/she does not share the particular portable device 106 identified at block 604. If the primary user 202 indicated that he/she does not share the particular portable device 106, program control advances to block 616, at which the impression designator 406 associates the demographic information of the primary user 202 with the impression data 130 to create AAM-adjusted EMM census data 503. Otherwise, if the primary user 202 indicated that he/she does share the particular portable device 106, program control advances to block 610. At block 610, the probability calculator 402 calculates a probability score for the primary user 202. In some examples, the probability calculator 402 calculates the probability score in accordance with Equation 1 above. At block 612, the calibration calculator 404 (FIG. 4) retrieves (e.g., from a pre-calculated table, etc.) or calculates a calibration factor (λ) based on the demographic information of the primary user 202 and the device type of the portable device 106. In some examples, the calibration factor (λ) is calculated in accordance with Equation 2 above. The example calibration calculator 404 calculates a threshold based on the calibration factor (λ). In some examples, the threshold is equal to $$\frac{\lambda}{HH},$$

where HH is the size of the primary user's household.

At block 614, the probability calculator 402 determines whether the probability score of the primary user 202 satisfies the threshold. In some examples, whether the probability score of the primary user 202 satisfies the threshold is determined in accordance to Equation 3 above. If the probability score of the primary user 202 satisfies the threshold, program control advances to block 616. Otherwise, if the probability score of the primary user 202 does not satisfy the threshold, program control advances to block 618. At block 616, the impression designator 406 (FIG. 4) associates the demographic information of the primary user 202 with the impression data 130 to create AAM-adjusted EMM census data 503. In some examples, the impression designator 406 stores the AAM-adjusted EMM census data 503 in the EMM census database 214 (FIG. 2).

At block 618, the probability calculator 402 calculates a probability score for each of the secondary user(s) 204 in the primary user's 202 household. At block 620, the impression designator 406 associates the demographic information of the secondary user 204 with the highest probability score calculated at block 618 with the impression retrieved at block 602 to create the AAM-adjusted EMM census data 503. In some examples, the impression designator 406 stores the AAM-adjusted EMM census data 503 into the EMM census database 214. At block 622, the probability calculator 402 determines whether there is another impression to be analyzed for an activity assignment. If there is another impression to be analyzed for an activity assignment, program control returns to block 602. Otherwise, if there is not another impression to be analyzed for an activity assignment, the example program 600 of FIG. 6 ends.

FIG. 7 is a flow diagram representative of example machine readable instructions 700 that may be executed to implement the example assignment modeler 216 of FIGS. 2 and 4 to construct an activity assignment model (e.g., the activity assignment model 506 of FIG. 5). Initially, at block 702, the assignment modeler 216 selects attributes to include in the activity assignment model 506. For example, the attributes may be information related to demographic information (e.g., gender, race/ethnicity, education level, age, gender, etc.), information related to households (e.g., household size, primary/secondary household language, etc.), information related to media (e.g., genre, daypart, etc.), and/or information related to the portable device 106 (FIG. 1) (e.g., device type, operating system, etc.). At block 704, the assignment modeler 216 uses the selected attributes to construct a candidate model with a training set of known EMMC data. The example candidate model may generated using any suitable technique such as gradient boost regression modeling technique, a k-nearest neighbor modeling technique, etc.

At block 706, the candidate model is evaluated using a validation set of known EMM census data. For example, a demographic impression from the EMM census data is input into the candidate model. In that example, the output of the candidate model (e.g., which member of the household the candidate model associated with the demographic impression) is compared to the known answer (e.g., the actual member of the household associated with the demographic impression. In some examples, a correct probability rate (CPR) is calculated by determining what percentage of the validation set the candidate model predicted correctly. For example, if the candidate model predicts sixty-five out of a hundred demographic impressions correctly, the CPR is 65%. In some examples where multiple validation sets are used, the CPR is an average value of the percentage of correct predictions. At block 708, the assignment modeler 216 determines whether the CPR satisfies (e.g., is greater than or equal to) a threshold. In some examples, the threshold is based on an error tolerance of customers of the AME 108 and/or a known amount of error in the training data set. If the CPR satisfies the threshold, program control advances to block 710. Otherwise, if the CPR does not satisfy the threshold, program control advances to block 712.

At block 710, the assignment modeler 216 sends the activity assignment model to the impression corrector 210. The example program 700 then ends. At block 712, the assignment modeler 216 adjusts and/or selects the attributes used in the candidate model. In some examples, to adjust the attributes used in the candidate model, the assignment modeler 216 selects one or more attributes that were not included in the candidate model generated at block 704. In some examples, the assignment modeler 216 selects the attributes based on a relative influence of each attribute. The relative influence indicates the predictive weight of the corresponding attribute on the probability score (but does not show how a particular attribute contributes to an individual probability score). For example, an attribute with a 53% relative influence will contribute to the probability score (e.g., the value of the attribute will affect the outcome of the activity assignment model) for 53% of the possible probability scores. In some such examples, the assignment modeler 216 calculates the relative influence of each of the attributes used in the candidate model. In some such examples, the assignment modeler 216 discards the attributes that have an influence below a threshold and/or picks the attributes with the highest influence (e.g. that add up to a target relative influence). Control returns to block 704 at which a new activity assignment model is constructed.

Figure 8:
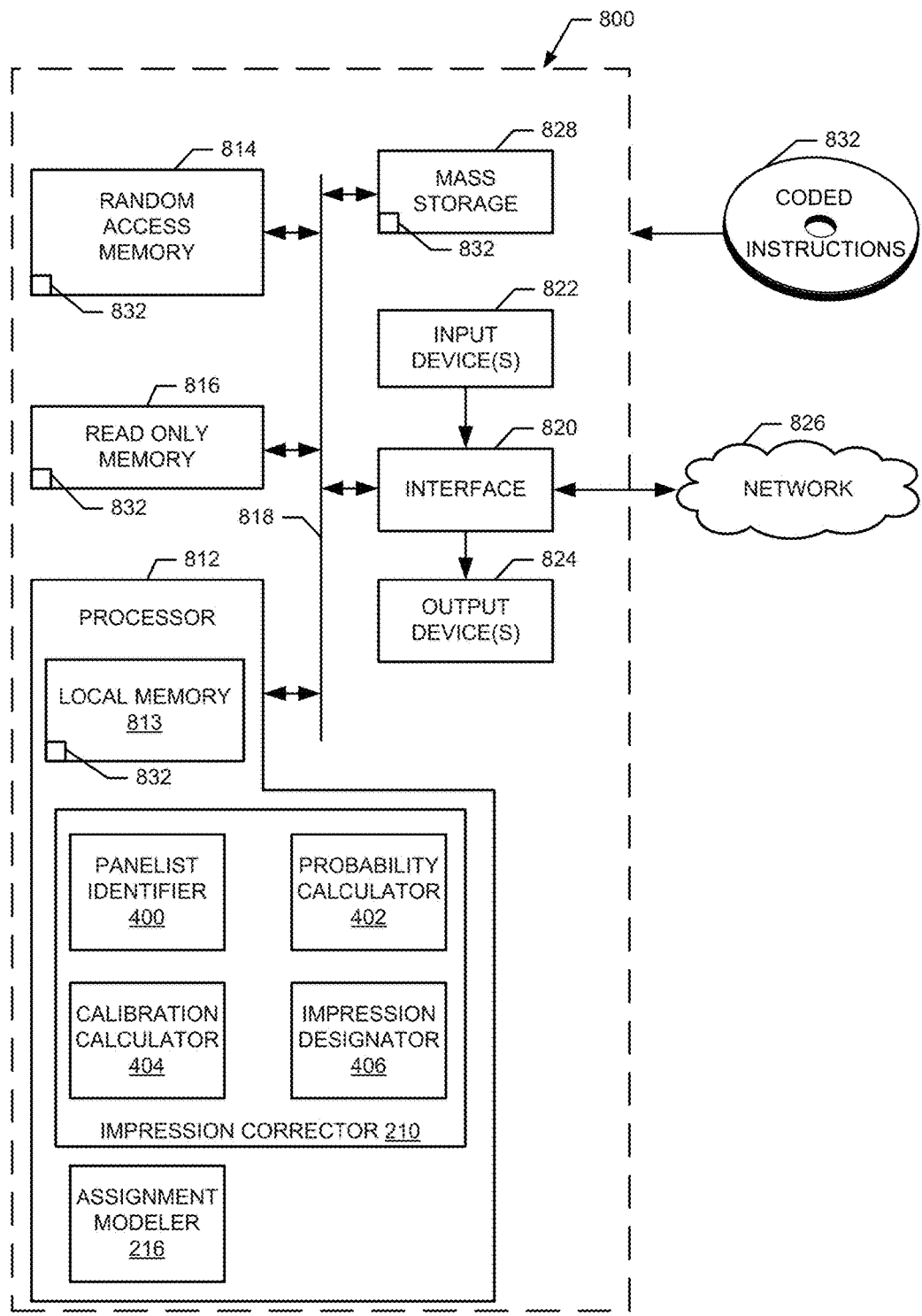
FIG. 8 is a block diagram of an example processor system structured to execute the example machine readable instructions represented by FIGS. 6 and/or 7 to implement the example impression corrector and/or assignment modeler of FIGS. 2 and/or 4.

FIG. 8 is a block diagram of an example processor platform 800 structured to execute the instructions of FIGS. 6 and/or 7 to implement the example impression corrector 210 and/or the example assignment modeler 216 of FIGS. 2 and/or 4. The processor platform 800 can be, for example, a server, a personal computer, a workstation, or any other type of computing device. In some examples, separate processor platforms 800 may be used to implement the example impression corrector 210 and the example assignment modeler 216.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The example processor 812 implements the example panelist identifier 400, the example probability calculator 402, the example calibration calculator 404, and the example impression designator 406 of the impression corrector 210. The example processor also implements the example assignment modeler 216. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the example machine readable instructions of FIGS. 6 and/or 7 may be stored in the mass storage device 828, in the volatile memory 814, in the non-volatile memory 816, and/or on a removable tangible computer readable storage medium such as a CD or DVD.

From the foregoing, it will be appreciated that examples have been disclosed which allow accurate association of demographic data with impressions generated through exposure to media on a portable device without requiring individual members of a household to self-identify. In such an example, computer processing resources are conserved by not requiring the processor to execute an additional application used to facilitate self-identification. Advantageously, network communication bandwidth is conserved because an additional self-identification application does not need to be maintained (e.g., downloaded, updated, etc.) and/or does not need to communicate with the AME 108.

Additionally, it will be appreciated that examples have been disclosed which enhance the operations of a computer to improve the accuracy of impression-based data so that computers and processing systems therein can be relied upon to produce audience analysis information with higher accuracies. In some examples, computers operate more efficiently by relatively quickly correcting misattributions in EMM census data s. In some examples, the corrected EMM census data is used to generate accurate misattribution correction factors (e.g., by calculating accurate device sharing probabilities, etc.). Such accurate misattribution correction factors are useful in subsequent processing for identifying exposure performances of different media so that media providers, advertisers, product manufacturers, and/or service providers can make more informed decisions on how to spend advertising dollars and/or media production and distribution dollars.

In some examples, using example processes disclosed herein, a computer can more efficiently and effectively determine misattribution error correction factors in impression data logged by the AME 108 and the database proprietors 104a-b without using large amounts of network communication bandwidth (e.g., conserving network communication bandwidth). For example, the computer conserves processing resources are not needed to continuously communicate with non-panelist individual online users (e.g. online users without an ongoing relationship with the AME 108) to request survey responses (e.g. probability surveys, etc.) about their online media access habits. In such an example, the AME 108 does not need to rely on such continuous survey responses from such online users. In some examples, survey responses from online users can be inaccurate due to inabilities or unwillingness of users to recollect online media accesses and/or survey responses can also be incomplete. By not requiring survey results from non-panelists, processor resources required to identify and supplement incomplete and/or inaccurate survey responses is eliminated.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to correct media measurement data generated by a server, comprising:
   an impression server, at an audience measurement entity, to generate electronic mobile measurement data based on network communications received from client devices, the network communications corresponding to media accessed at the client devices;
   an assignment modeler to:
   select attributes associated with the electronic mobile measurement data to include in a model;

generate the model based on the attributes and a first portion of the electronic mobile measurement data; and determine a percentage of a second portion of the electronic mobile measurement data that the model correctly associates with corresponding users of the client devices; and an impression corrector to, when the percentage satisfies a threshold:

determine: (a) when a user operating a client device is a primary user based on the model, and (b) when the user operating the client device is one of a plurality of secondary users based on the model; and associate demographic information of the identified user with the electronic mobile measurement data to reduce a misattribution error generated by the impression server when generating the electronic mobile measurement data.

2. The apparatus of claim 1, wherein the associating of the demographic information of the identified user operating the client device with the electronic mobile measurement data is further to reduce processing resources on the client device by identifying the user operating the client device without requiring the user operating the client device to self-identify.

3. The apparatus of claim 1 further including:
a processor to implement the assignment modeler and the impression corrector; and
a memory in circuit with the processor, the memory to store the electronic mobile measurement data and the attributes.

4. The apparatus of claim 1, wherein the attributes are first attributes and the model is a first model, and when the percentage does not satisfy the threshold:

the assignment modeler to:
select second attributes associated with the electronic mobile measurement data; and
generate a second model based on the second attributes and the first portion of the electronic mobile measurement data; and the impression corrector to:
identify the user operating the client device as at least one of the primary user or one of the plurality of secondary users based on the second model; and
associate demographic information of the identified user with the electronic mobile measurement data to reduce the misattribution error.

5. The apparatus of claim 1, wherein the attributes include at least one of demographic information, household information, media information, or information related to the client devices.

6. The apparatus of claim 1, wherein the threshold is based on at least one of an error tolerance of a customer of the audience measurement entity or a known amount of error in the first portion of the electronic mobile measurement data.

7. The apparatus of claim 1, wherein when a size of a household of the user operating the client device equals one, the impression corrector is to identify the primary user as the user operating the client device.

8. A tangible computer readable storage medium comprising instructions which, when executed, cause a processor to at least:

generate electronic mobile measurement data based on network communications received from client devices, the network communications corresponding to media accessed at the client devices;

select attributes associated with the electronic mobile measurement data to include in a model;

generate the model based on the attributes and a first portion of the electronic mobile measurement data;

determine a percentage of a second portion of the electronic mobile measurement data that the model correctly associates with corresponding users of the client devices; and when the percentage satisfies a threshold:

determine: (a) when a user operating a client device is a primary user based on the model, and (b) when the user operating the client device is one of a plurality of secondary users based on the model; and associate demographic information of the identified user with the electronic mobile measurement data to reduce a misattribution error generated by an impression server when generating the electronic mobile measurement data.

9. The tangible computer readable storage medium as defined in claim 8, wherein the instructions cause the processor to associate the demographic information of the identified user operating the client device with the electronic mobile measurement data to reduce processing resources on the client device by identifying the user operating the client device without requiring the user operating the client device to self-identify.

10. The tangible computer readable storage medium as defined in claim 8, wherein the attributes are first attributes, the model is a first model, and when the percentage does not satisfy the threshold, the instructions are to further cause the processor to:

select second attributes associated with the electronic mobile measurement data;

generate a second model based on the second attributes and the first portion of the electronic mobile measurement data;

identify the user operating the client device as at least one of the primary user or one of the plurality of secondary users based on the second model; and associate the demographic information of the identified user with the electronic mobile measurement data to reduce the misattribution error.

11. The tangible computer readable storage medium as defined in claim 8, wherein the threshold is based on at least one of an error tolerance of the user identification or a known amount of error in the first portion of the electronic mobile measurement data.

12. The tangible computer readable storage medium as defined in claim 8, wherein the instructions are to further cause the processor to, when a size of a household of the user operating the client device equals one, identify the primary user as the user operating the client device.

13. The tangible computer readable storage medium as defined in claim 8, wherein the instructions are to further cause the processor to, when the primary user indicates that the primary user does not share the client device, identify the primary user as the user operating the client device.

14. A method to correct media measurement data generated by a server, comprising:

generating electronic mobile measurement data based on network communications received from client devices, the network communications corresponding to media accessed at the client devices;

selecting, by executing an instruction with a processor, attributes associated with the electronic mobile measurement data to include in a model;

generating, by executing an instruction with the processor, the model based on the attributes and a first portion of the electronic mobile measurement data;

determining, by executing an instruction with the processor, a percentage of a second portion of the electronic mobile measurement data that the model correctly associates with corresponding users of the client devices; and in response to the percentage satisfying a threshold, executing an instruction with the processor to:

determine: (a) when a user operating a client device is a primary user based on the model, and (b) when the user operating the client device is one of a plurality of secondary users based on the model; and associate demographic information of the identified user with the electronic mobile measurement data to reduce a misattribution error generated by an impression server when generating the electronic mobile measurement data.

15. The method of claim 14, wherein executing an instruction with the processor to associate the demographic information of the identified user operating the client device with the electronic mobile measurement data is further to reduce processing resources on the client by identifying the user operating the client device without requiring the user operating the client device to self-identify.

16. The method of claim 14, wherein the attributes are first attributes, the model is a first model, and further including, in response to the percentage not satisfying the threshold:

selecting second attributes associated with the electronic mobile measurement data;

generating a second model based on the second attributes and the first portion of the electronic mobile measurement data;

identifying the user operating the client device as at least one of the primary user or one of the plurality of secondary users based on the second model; and associating the demographic information of the identified user with the electronic mobile measurement data to reduce the misattribution error.

17. The method of claim 14, wherein the attributes include at least one of demographic information, household information, media information, or information related to the client devices.

18. The method of claim 14, wherein the threshold is based on at least one of an error tolerance of the user identification or a known amount of error in the first portion of the electronic mobile measurement data.

19. The method of claim 14, further including, in response to a size of a household of the user operating the client device equaling one, identifying the primary user as the user operating the client device.

20. The method of claim 14, further including, in response to the primary user indicating that the primary user does not share the client device, identifying the primary user as the user operating the client device.

* * * * *

UNITED STATES PATENT AND TRADEMARK OFFICE
CERTIFICATE OF CORRECTION

PATENT NO. : 10,217,122 B2
APPLICATION NO. : 15/953177
DATED : February 26, 2019
INVENTOR(S) : Rao et al.

Page 1 of 1

It is certified that error appears in the above-identified patent and that said Letters Patent is hereby corrected as shown below:

In the Claims

Column 31, Line 14 Claim 1: Delete "identified"

Column 31, Line 21 Claim 2: Delete "identified"

Column 31, Line 45 Claim 4: Delete "identified"

Column 32, Line 14 Claim 8: Delete "identified"

Column 32, Line 23 Claim 9: Delete "identified"

Column 32, Line 41 Claim 10: Delete "identified"

Column 33, Line 15 Claim 14: Delete "identified"

Column 33, Line 22 Claim 15: Delete "identified"

Column 34, Line 9 Claim 16: Delete "identified"

Signed and Sealed this
Ninth Day of July, 2019

Andrei Iancu
*Director of the United States Patent and Trademark Office*